United States Patent
Liu et al.

(10) Patent No.: US 9,064,625 B2
(45) Date of Patent: Jun. 23, 2015

(54) METHODS FOR SEQUENTIALLY LAMINATING RARE EARTH PERMANENT MAGNETS WITH SUFLIDE-BASED DIELECTRIC LAYER

(75) Inventors: Jinfang Liu, Lancaster, PA (US); Chins Chinnasamy, Lancaster, PA (US); Joshua L. Bender, Thorndale, PA (US); Melania Marinescu, Reinholds, PA (US)

(73) Assignee: Electron Energy Corporation, Landisville, PA (US)

( * ) Notice: Subject to any disclaimer, the term of this patent is extended or adjusted under 35 U.S.C. 154(b) by 243 days.

(21) Appl. No.: 13/205,714

(22) Filed: Aug. 9, 2011

(65) Prior Publication Data

US 2013/0038159 A1    Feb. 14, 2013

(51) Int. Cl.

| | |
|---|---|
| *B23K 20/00* | (2006.01) |
| *H01F 7/02* | (2006.01) |
| *H01F 10/12* | (2006.01) |
| *B32B 37/18* | (2006.01) |
| *H01F 1/055* | (2006.01) |
| *H01F 1/057* | (2006.01) |

(52) U.S. Cl.
CPC .......... *H01F 7/021* (2013.01); *B32B 37/18* (2013.01); *B23K 20/00* (2013.01); *H01F 7/02* (2013.01); *H01F 1/055* (2013.01); *H01F 1/057* (2013.01); *H01F 10/126* (2013.01)

(58) Field of Classification Search
None
See application file for complete search history.

(56) References Cited

U.S. PATENT DOCUMENTS

| | | | |
|---|---|---|---|
| 5,091,667 A * | 2/1992 | Tomite | 310/154.26 |
| 5,132,945 A | 7/1992 | Osato et al. | |
| 5,300,317 A | 4/1994 | Ivarson | |
| 5,679,473 A | 10/1997 | Murayama et al. | |
| 5,763,085 A | 6/1998 | Atarashi et al. | |
| 5,818,139 A * | 10/1998 | Yamagiwa et al. | 310/156.45 |
| 5,935,722 A | 8/1999 | Moorhead et al. | |
| 6,007,312 A * | 12/1999 | Pieters et al. | 417/420 |
| 6,177,745 B1 * | 1/2001 | Narita et al. | 310/156.43 |
| 6,753,751 B2 * | 6/2004 | Fujiwara et al. | 336/110 |
| 6,765,319 B1 * | 7/2004 | Thompson | 310/43 |
| 6,856,231 B2 * | 2/2005 | Fujiwara et al. | 336/233 |
| 7,488,395 B2 | 2/2009 | Nakamura et al. | |
| 7,559,996 B2 | 7/2009 | Miyata et al. | |
| 7,892,365 B2 | 2/2011 | Tomizawa et al. | |
| 7,919,200 B2 | 4/2011 | Mori et al. | |
| 8,481,178 B2 * | 7/2013 | Watanabe et al. | 428/692.1 |

(Continued)

FOREIGN PATENT DOCUMENTS

JP    2000-050545 A    2/2000

OTHER PUBLICATIONS

International Report on Patentability from PCT/US2012/049947-Feb. 20, 2014.

(Continued)

*Primary Examiner* — Kiley Stoner

(57) ABSTRACT

Methods of manufacturing laminated, rare earth, permanent magnets with dielectric layers having increased electrical resistivity and improved mechanical strength suitable for use in high performance, rotating machines comprising sequentially laminating permanent magnet layers with transition and/or diffusion reaction layers; wherein the transition and/or diffusion reaction layers surround sulfide-based dielectric layers, thereby avoiding direct contact between the dielectric layers with permanent magnet layers.

17 Claims, 17 Drawing Sheets

(56) References Cited

U.S. PATENT DOCUMENTS

| | | | |
|---|---|---|---|
| 2006/0022175 A1* | 2/2006 | Komuro et al. | 252/500 |
| 2006/0191601 A1* | 8/2006 | Komuro et al. | 148/302 |
| 2006/0292395 A1 | 12/2006 | Mori et al. | |
| 2009/0277268 A1* | 11/2009 | Ishii | 73/514.39 |
| 2009/0289748 A1* | 11/2009 | Komuro et al. | 335/302 |
| 2010/0219921 A1* | 9/2010 | Yamashita et al. | 335/302 |
| 2011/0057756 A1 | 3/2011 | Marinescu et al. | |
| 2011/0241586 A1* | 10/2011 | Tobari et al. | 318/400.23 |
| 2012/0001711 A1* | 1/2012 | McCallum et al. | 335/302 |
| 2012/0019341 A1* | 1/2012 | Gabay et al. | 335/306 |
| 2012/0242181 A1* | 9/2012 | Gruendl et al. | 310/152 |
| 2013/0038160 A1* | 2/2013 | Liu et al. | 310/156.01 |
| 2013/0038164 A1* | 2/2013 | Liu et al. | 310/156.38 |
| 2013/0069746 A1* | 3/2013 | Komuro et al. | 335/302 |
| 2014/0045648 A1* | 2/2014 | Bangura et al. | 477/3 |
| 2014/0084731 A1* | 3/2014 | Iwami et al. | 310/156.07 |
| 2014/0145547 A1* | 5/2014 | Nakano et al. | 310/216.069 |
| 2014/0375164 A1* | 12/2014 | Deak et al. | 310/156.43 |

OTHER PUBLICATIONS

U.S. Appl. No. 12/707,227, filed Feb. 17, 2010.

\* cited by examiner

METHODS FOR SEQUENTIALLY LAMINATING RARE EARTH PERMANENT MAGNETS WITH SUFLIDE-BASED DIELECTRIC LAYER

FIELD OF THE INVENTION

The present invention is directed to methods of manufacturing mechanically strong, sequentially laminated, rare earth, permanent magnets having sulfide-based dielectric layers separated from permanent magnet layers by transition and/or diffusion reaction layers.

BACKGROUND OF THE INVENTION

The present invention relates to methods for sequentially laminated, rare earth, permanent magnets for use in high performance, rotating machines. The high electrical resistivity, rare earth, permanent magnets produced by the methods of the invention, with sulfide-based dielectric layers; are characterized by reduced eddy current losses combined with improved mechanical properties suitable for use in high performance, rotating machines. Rare earth, permanent magnets produced by methods of the present invention feature sulfide-based dielectric layer(s), combined with improved mechanical properties, are particularly well suited for commercial use in high performance, rotating machines, such as motors and generators.

Addressing eddy current losses in permanent magnets is critical in the design of high performance motors and high speed generators. Reduction of these eddy current losses in permanent magnets used with rotating machines is preferably accomplished by increasing the electrical resistivity of the permanent magnets. For example, when rare earth permanent, magnets are subjected to variable magnetic flux, and the electrical resistivity is low, excessive heat attributed to an eddy current is generated. This increased heat reduces the magnetic properties of the permanent magnet with corresponding reductions in the efficiency of rotating machines.

Adding layers of high resistivity, dielectric material to laminated, rare earth magnets, perpendicular to the plane of the eddy currents, generally results in a substantial decrease of eddy current losses. However, heretofore adding these layers of high resistivity material to laminated, permanent magnets were generally associated with shortcomings in mechanical properties. Specifically, these composite, laminated, permanent magnets with improved electrical resistivity failed in commercial use in high performance, rotating machines due to shortcomings in mechanical properties. Demands of high performance, rotating machines require improved mechanical properties beyond those traditionally available in laminates with suitable dielectric properties.

Rare earth, permanent magnets with improved electrical resistivity are described in U.S. Patent Publication No. US2006/0292395 A1 and U.S. Pat. Nos. 5,935,722; 7,488,395 B2; 5,300,317; 5,679,473; 5,763,085 and in U.S. patent application Ser. No. 12/707,227, filed Feb. 17, 2010, entitled "Rare Earth Laminated Composite Magnets with Increased Electrical Resistivity.

U.S. Patent Publication No. 2006/0292395 A1 teaches fabrication of rare earth magnets with high strength and high electrical resistance. The structure includes R—Fe—B-based rare earth magnet particles which are enclosed with a high strength and high electrical resistance composite layer consisting of a glass phase or R oxide particles dispersed in a glass phase, and R oxide particle based mixture layers (R=rare earth elements).

U.S. Pat. No. 5,935,722 teaches the fabrication of laminated composite structures of alternating metal powder layers, and layers formed of an inorganic bonding media consisting of ceramic, glass, and glass-ceramic layers which are sintered together. The ceramic, glass, and glass-ceramic layers serve as an electrical insulation material used to minimized eddy current losses, as well as an agent that bonds the metal powder layers into a dimensionally-stable body.

U.S. Pat. No. 7,488,395 teaches fabrication of a functionally graded rare earth permanent magnets having a reduced eddy current loss. The magnets are based on R—Fe—B (R=rare earth elements) and the method consists in immersing the sintered magnet body into a slurry of powders containing fluorine and at least one element E selected from alkaline earth metal elements and rare earth elements, mixed with ethanol.

Subsequent heat treatment of the magnets covered with the respective slurry allows for the absorption and infiltration of fluorine and element E from the surface into the body of the magnet. Thus, the magnet body includes a surface layer having a higher electric resistance than the interior.

U.S. patent application Ser. No. 12/707,227, (Pub. No. 2011-0200839) teaches laminated, composite, rare earth magnets with improved electrical resistivity.

To date, there is no teaching implied nor suggested in the prior art of the methods of the present invention which are responsible for producing:

A. "Intermediate" transition and/or diffusion reaction layers, combined with sequentially laminated layers of permanent magnets based on Sm—Co or Nd—Fe—B, where the transition and/or diffusion reaction layers surround and separate a sulfide-based, dielectric layer(s) from permanent magnet layers. The sequentially laminated, rare earth, permanent magnets of the present invention comprise Sm—Co or Nd—Fe—B layers separated from sulfide-based, dielectric layers by transition and/or diffusion reaction layers. All the layers in the sequentially laminated, rare earth, permanent magnet produced according to the methods of the present invention are consolidated simultaneously with the sequentially laminated, permanent magnet indicating acceptable magnetic properties with improved mechanical strength sufficient to support use with high performance, high speed rotating machines.

B. Monolithic, sequentially laminated structures consisting of sequential layers of rare earth based magnets and layers of sulfide-based dielectric materials separated from the permanent magnet layers by transition and/or diffusion reaction layers. These sulfide-based, dielectric layers provide unexpected advantages in electrical resistivity as the laminated, dielectric layers partly interact at the interface, creating a transition and/or diffusion reaction layer separating the dielectric layer from the permanent magnet layer. The resultant sequentially laminated, rare earth, permanent magnets produced by the methods of the present invention exhibit exceptional electrical resistivity combined with no compromise in magnetic properties and improved mechanical strength.

There is no teaching in the prior art of manufacturing methods for producing "intermediate", "transition", and/or "diffusion reaction" layers separating laminated layers of rare earth, permanent magnet materials based on Sm—Co or Nd—Fe—B from layers of sulfide-based, dielectric materials selected from S or mixtures of sulfide and fluoride.

For purposes of the present invention, sulfide-based dielectrics include: $Al_2S_3$, $Sb_2S_3$, $As_2S_3$, $BaS$, $BeS$, $Bi_2S_3$, $B_2S_3$, $CdS$, $CaS$, $CeS$, $Ce_2S_3$, $WS$, $Cr_2S_3$, $CoS$, $CoS_2$, $Cu_2S$, $CuS$, $Dy_2S_3$, $Er_2S_3$, $EuS$, $Gd_2S_3$, $Ga_2S_3$, $GeS$, $GeS_2$, $HfS_2$, $Ho_2S_3$, $In_2S$, $InS$, $FeS$, $FeS_2$, $La_2S_3$, $LaS_2$, $La_2O_2S$, $PbS$, $Li_2S$, $MgS$, $MnS$, $HgS$, $MoS_2$, $Nd_2S_3$, $NiS$, $NdS$, $K_2S$, $Pr_2S_3$, $Sm_2S_3$, $Sc_2S_3$, $SiS_2$, $Ag_2S$, $Na_2S$, $SrS$, $Tb_2S$, $Tl_2S$, $ThS_2$, $Tm_2S_3$, $SnS$, $SnS_2$, $TiS_2$, $WS_2$, $US_2$, $V_2S_3$, $Yb_2S_3$, $Y_2S_3$, $Y_2S_3$, $Y_2O_2S$, $ZnS$ and $ZrS_2$ or a combination of any of these materials.

For purposes of the methods of manufacturing of the present invention, sulfide-based, dielectric materials include the sulfide compounds described above and:

Oxysulfides,
Sulfides and oxyfluorides,
Mixtures of sulfides,
Mixtures of sulfides and fluorides,
Mixtures of sulfides, fluorides, oxysulfides and/or oxyfluorides, and/or
Each of the above mixed with rare earth alloys.

OBJECTS OF THE INVENTION

A primary object of the methods of manufacture of the present invention is to produce mechanically strong, high electrical resistivity, Sm—Co and Nd—Fe—B, sequentially laminated, rare earth, permanent magnets with sulfide-based, dielectric layers separated from the rare earth, permanent magnet layers by transition and/or diffusion reaction layers.

Another object of the methods of manufacture of the present invention is to produce the first sequentially laminated, Sm—Co and Nd—Fe—B magnets capable of delivering high electrical resistivity without sacrificing mechanical strength or magnetic properties.

An object of the methods of manufacture of the present invention is to form sequentially laminated structures with increased electrical resistivity consisting of sequential layers of rare earth, permanent magnet and sulfide-based, dielectric layers, which are separated from the permanent magnet layers by transition and/or diffusion reaction layers, where the sequentially laminated magnets are suitable for reducing eddy current losses without sacrificing rare earth, permanent magnet properties and with mechanical strength suitable for use in high performance motors and generators.

Another object of the methods of manufacture of the present invention is to form sequentially laminated structures with increased electrical resistivity consisting of sequential layers of rare earth, permanent magnets separated from layers of mixtures of sulfide-based, dielectric materials and rare earth rich alloys separated from the permanent magnet layers by transition and/or diffusion reaction layers; where the sequential laminate is suitable for reducing eddy current losses when used in high performance motors and generators, while maintaining a mechanically strong laminate structure without sacrificing magnetic properties.

A further object of the methods of manufacture of the present invention is to form sequentially laminated structures with increased electrical resistivity consisting of sequential layers of (1) sulfide-based dielectric layers, (2) transition and/or diffusion reaction, rare earth, rich alloy layers surrounding the dielectric layers, and (3) rare earth, permanent magnet layers suitable for reducing eddy current losses when used in high performance motors and generators, while indicating improved mechanical strength over traditional, sequentially laminated, rare earth, permanent magnets.

Still a further object of the methods of manufacture of the present invention is to form sequentially laminated structures with increased electrical resistivity consisting of sequential layers of sulfide-based dielectric materials; transition and/or diffusion reaction layers and rare earth, permanent magnet layers, where the sequentially laminated, permanent magnet is suitable for reducing eddy current losses when used in high performance motors and generators.

Another object of the methods of manufacture of the present invention is to form mechanically strong, sequentially laminated structures with increased electrical resistivity consisting of layers of sulfide dielectric materials surrounded by transition and/or diffusion reaction layers and layers of rare earth, permanent magnet materials sequentially laminated, suitable for reducing eddy current losses when used in high performance motors and generators.

Another object of the methods of manufacture of the present invention is to form mechanically strong, sequentially laminated structures with increased electrical resistivity consisting of layers of dielectric layer made of sulfide and fluoride mixtures surrounded by transition and/or diffusion reaction layers and layers of rare earth, permanent magnet materials sequentially laminated, suitable for reducing eddy current losses when used in high performance motors and generators.

Yet another object of the methods of manufacture of the present invention is to form sequentially laminated, rare earth, permanent magnet structures with increased electrical resistivity with mechanical strength suitable for use in high performance, rotating machines.

BRIEF DESCRIPTION OF THE DRAWINGS

The above and other objects, features and advantages of the methods of manufacturing of the present invention will be better understood from the following detailed description of the invention taken in conjunction with accompanying FIGS. 1 through 17 of the Drawings which illustrate sequentially laminated, permanent magnet layers, transition and/or diffusion reaction layers surrounding sulfide-based dielectric layers.

SUMMARY OF THE INVENTION

Figure 1:
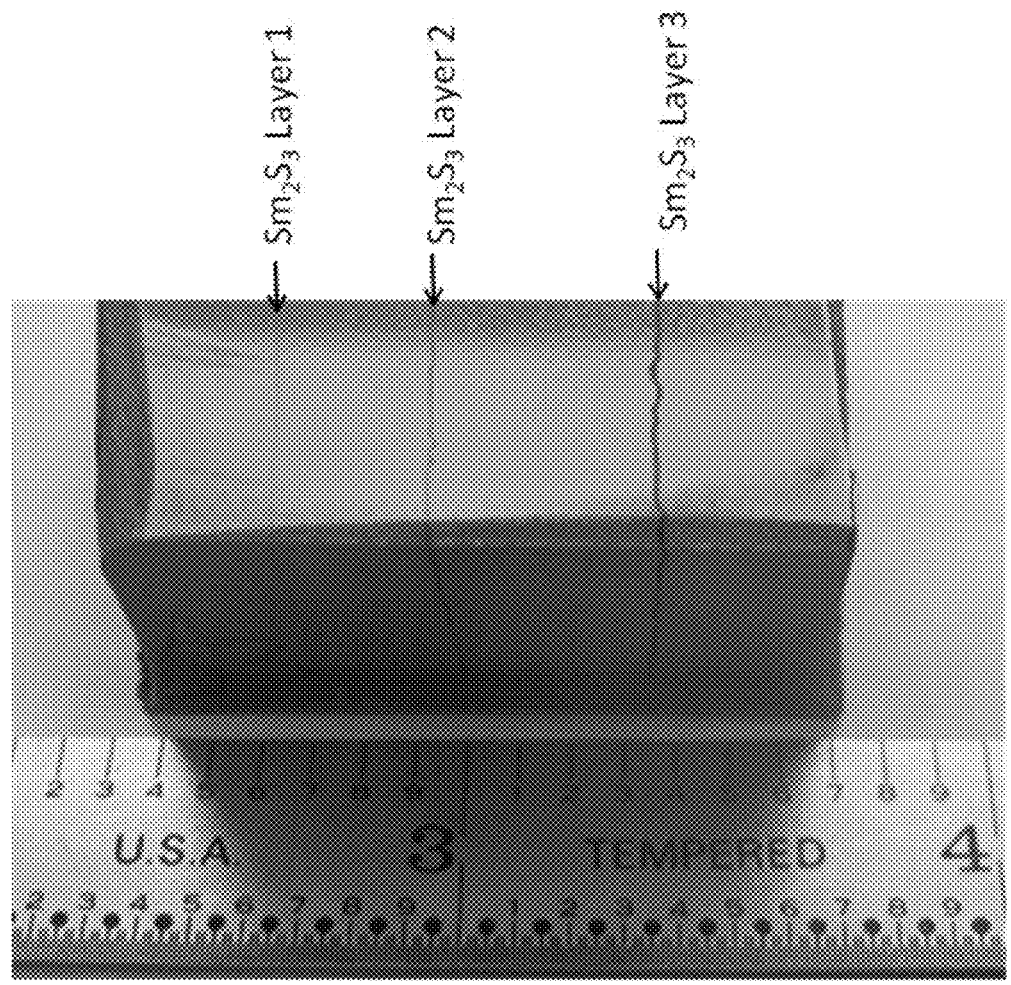
FIG. 1 is a photograph of a sequentially laminated magnet manufactured according to methods of the invention indicating three $Sm_2S_3$ dielectric layers.

The following terms are defined as set out below, to insure a clear understanding of the methods of manufacture of the invention and its unexpected resistivity/mechanical properties as detailed in the Examples, Drawings and Tables, as set forth below and in the claims.

"Rare earth permanent magnets" are defined as permanent magnets based on intermetallic compounds with rare earth elements, RE, such as Nd and Sm, transition metals, such as Fe and Co, and, optional, metalloids such as B. Other elements may be added to improve magnetic properties.

"Sequentially laminated structures" are defined as structures containing at least two permanent magnet layers separated from one dielectric layer by at least two transition and/or diffusion reaction layers.

"Eddy current" is defined as the vortex currents generated in electrically conductive materials when exposed to variable magnetic fields. Eddy currents result in building up heat which adversely affects the magnetic properties of permanent magnets.

"Electrical resistivity" is defined as a measure of the resistance strength by which a material opposes the flow of electric current.

"Dielectric" is defined as a material exhibiting high electrical resistivity exceeding $1M\Omega$.

"High electrical resistivity layer" is defined as a sulfide-based, laminate layer of material with electrical resistivity greater than that of surrounding transition and/or diffusion reaction layers and the rare earth, permanent magnet layers.

"Transition layer" is here defined as a layer introduced into a sequentially laminated, permanent magnet produced by the methods of the present invention, where the transition layer properties compensate for alteration of the stoichiometry at the interface between two distinct crystallographic layers having diverse compositions and diverse functions (i.e., a dielectric function and a magnet function).

"Diffusion reaction layers" are defined as layers in sequentially laminated, permanent magnets produced according to the methods of the invention that surround sulfide-based dielectric layers physically separating the permanent magnet layers from sulfide-based, dielectric layers.

"Rare earth rich alloy" is defined as an alloy containing one or more rare earth element(s) in an amount exceeding specific phase stoichiometries.

"Green compact" defines a permanent magnet composite which is consolidate according to the methods of the present invention, by pressing the precursor powders at room temperature, resulting in a density less than that of the bulk (with no porosity) counterpart.

"Elemental diffusion" is defined as the diffusion or migration of atomic species in the transition and/or diffusion reaction layer due to thermal activation according to the methods of the present invention.

"Diffusion reaction interface layer" is here defined as that region between the permanent magnet layers and the dielectric layers, produced according to the methods of the present invention, where the original stoichiometry is altered due to the diffusion of the atomic species and their eventual reaction.

"Sulfide-based dielectric material" is defined as sulfides, oxysulfides, sulfide and oxyfluoride mixtures, mixtures of sulfides and fluorides and mixtures of sulfides, fluorides, oxysulfides and/or oxyfluorides and where each of the above can be mixed with rare earth alloys.

"Sequentially laminated permanent magnets with sulfide-based dielectric layers" are defined as monolithic, sequentially laminated structures consisting of sequential layers of rare earth-based magnets, transition and/or diffusion reaction layers surrounding sulfide-based dielectric layers produced according to the methods of the present invention.

"Mechanically strong, sequentially laminated, rare earth, permanent magnets with enhanced electrical resistivity" produced according to the methods of the present invention are defined as magnets of the invention which exhibit mechanical strength:

(a) at least 50% that of non-laminated rare earth magnets, and
(b) substantially greater than that of certain laminated magnets without a sulfide-based dielectric layer. The mechanical strength of the rare earth, permanent magnets of the invention is dependent, in part, upon the thickness of sulfide-based dielectric layers.

DETAILED DESCRIPTION OF THE INVENTION

An accepted approach to minimizing eddy current losses that plague rare earth permanent magnets used in high performance, electric motors or other rotating machines is to machine rare earth permanent magnets into segments which are subsequently assembled into the desired configuration or to alternatively blend the magnet powder precursor with an electrical insulating material.

The present invention provides for an improved manufacturing process of the invention for producing rare earth, permanent magnets with minimum eddy current losses; comprising forming monolithic laminated structures consisting of sequential (1) layers of rare earth magnets, (2) layers of sulfide-based dielectrics and/or layers of mixtures of rare earth rich alloys and sulfide-based dielectric materials, separated by (3) transition and/or diffusion reaction layers.

This sequential laminating process of the methods of manufacture of the present invention results in transition and/or diffusion reaction layers separating the sulfide-based dielectric layer from rare earth, permanent magnet layers as shown in FIGS. 3, 5, 6, 8, 10 and 16 of the Drawings.

The function of the transition and/or diffusion reaction layers is to compensate for an interaction that occurs between the sulfide-based dielectric layer and the rare earth magnet layer. This interaction modifies the stoichiometry at the rare earth, permanent magnet/dielectric interface. The resulting transition and/or diffusion reaction layer accommodates variances in diffusion reactions between the dielectric layer and the various permanent magnet layers or permanent magnet alloy layers comprising the rare earth, permanent magnet layers.

It is suggested that the transition and/or diffusion reaction layer surrounding the sulfide-based dielectric layer, produced by methods of manufacture of the present invention, plays a key role in the improved mechanical strength of the sequentially laminated, permanent magnets of the invention.

The laminated, permanent magnets produced according to the methods of manufacture of the present invention comprise sequential layers whose compositions interact at the interface with the dielectric layer. Laminated, permanent magnets of the invention, as detailed in Examples 1 through 8 and further illustrated in FIGS. 1 through 17 and in Table 2; show unexpected increases in electrical resistivity over permanent magnets without sulfide-based, dielectric additions. This unexpected increase in electrical resistivity is achieved without sacrifice in mechanical strength or in magnetic properties.

In a preferred embodiment of the methods of manufacture of the present invention, substances for the dielectric layer are selected from the group consisting sulfide-based, dielectric/semiconductor materials, wherein sulfides refers to the group consisting of $Al_2S_3$, $Sb_2S_3$, $As_2S_3$, $BaS$, $BeS$, $Bi_2S_3$, $B_2S_3$, $CdS$, $CaS$, $CeS$, $Ce_2S_3$, $WS$, $Cr_2S_3$, $CoS$, $CoS_2$, $Cu_2S$, $CuS$, $Dy_2S_3$, $Er_2S_3$, $EuS$, $Gd_2S_3$, $Ga_2S_3$, $GeS$, $GeS_2$, $HfS_2$, $Ho_2S_3$, $In_2S$, $InS$, $FeS$, $FeS_2$, $La_2S_3$, $LaS_2$, $La_2O_2S$, $PbS$, $Li_2S$, $MgS$, $MnS$, $HgS$, $MoS_2$, $Nd_2S_3$, $NiS$, $NdS$, $K_2S$, $Pr_2S_3$, $Sm_2S_3$, $Sc_2S_3$, $SiS_2$, $Ag_2S$, $Na_2S$, $SrS$, $Tb_2S$, $Tl_2S$, $ThS_2$, $Tm_2S_3$, $SnS$, $SnS_2$, $TiS_2$, $WS_2$, $US_2$, $V_2S_3$, $Yb_2S_3$, $Y_2S_3$, $Y_2S_3$, $Y_2O_2S$, $ZnS$, $ZrS_2$ and combinations thereof, as well as combinations of any of these materials with sulfides, oxysulfides, sulfides and oxyfluorides, mixtures of sulfides; sulfides and fluorides; sulfides, fluorides, oxysulfides and oxyfluorides. In addition, mixtures of all of the above with rare earth alloys can be used as the dielectric layer.

The preferred rare earth permanent magnet materials used in the methods of manufacture of the present invention include Sm—Co and Nd—Fe—B based intermetallic compounds, which are described in Examples 1 through 8 and FIGS. 1 through 17 of the Drawings. Additional sequentially laminated magnets of the invention are set forth in Table 2 with Examples 9 through 17.

Figure 2:
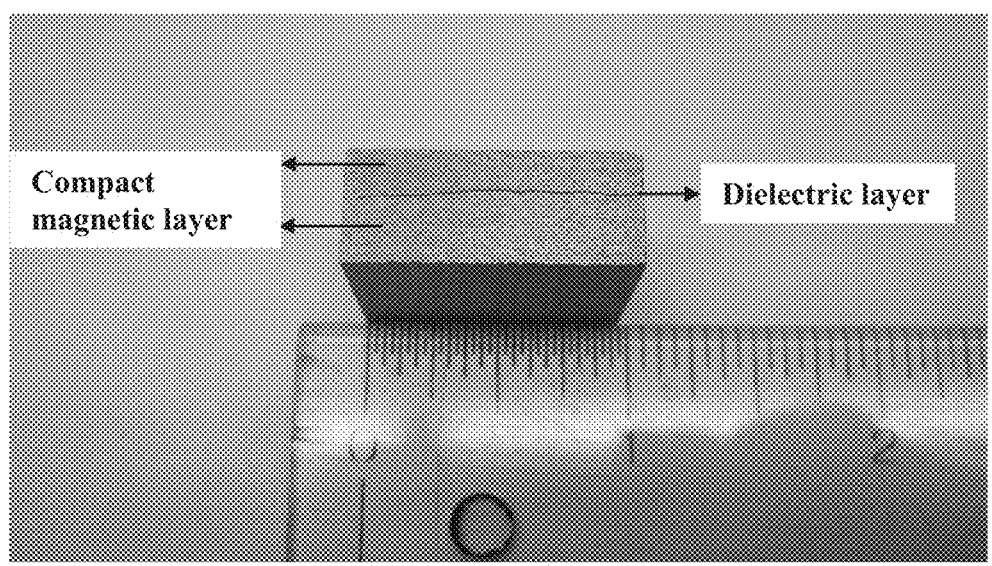
FIG. 2 is a photograph of another view of the sequentially laminated magnet produced according to the methods of the invention, shown in FIG. 1, indicating a dielectric layer of $Sm_2S_3$ and compact permanent magnetic layers.
Figure 3:
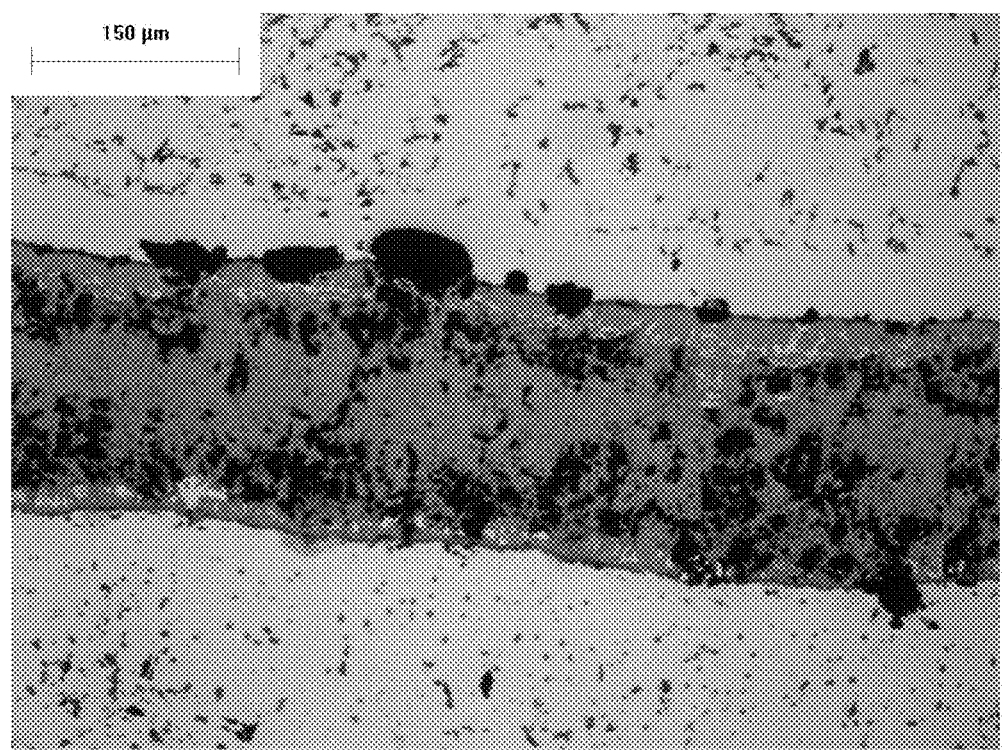
FIG. 3 is an optical photograph showing the thickness and uniformity of a sulfide-based dielectric layer produced according to the methods of manufacture of the present invention.

The distinctive, magnetic properties of the sequentially laminated magnets produced according to the present invention are based on the morphology of sequentially laminated, permanent magnet layers with sulfide-based, dielectric layers where the dielectric layer is accompanied by transition and/or diffusion reaction layers separating dielectric layer(s) from rare earth, permanent magnet layer(s) as shown in FIGS. 1 through 3; FIGS. 5 and 6 and FIGS. 12 through 14 of the Drawings.

In the sequentially laminated magnets produced by methods of the present invention, the composition of the rare earth permanent magnet material, particularly the amount of the rare earth component in the laminate, is increased at the interface with the dielectric layer, i.e., at the transition and/or diffusion reaction layer. This can be achieved by capitalizing on different morphologies: (a) by replacing pure dielectric substances with mixtures of dielectric substances with rare earth rich alloys, or (b) by using rare earth, rich alloy, transition and/or diffusion reaction layers between dielectric layers and magnet layers. This elemental diffusion feature of the magnets produced according to the methods of the present invention is achieved during thermal processing of the laminate rare earth magnets of the invention, resulting in transition and/or diffusion reaction layers forming at the interface between the Sm-rich magnet layer and the sulfide-based, dielectric layer. This is shown, for example, in FIG. 5 and described in Example 2.

The thickness of the dielectric layer in the sequentially laminated magnet, produced according to the methods of manufacture of the present invention, is preferably adjusted between an upper limit determined by bonding strength and a lower limit controlled by continuity of the dielectric layer. In a preferred embodiment of the methods of manufacture of the invention, the thickness of the dielectric layer is normally less than 500 µm. More preferably, the dielectric layer is less than 100 µm thick. The number of dielectric layers in the laminate magnets will be determined by the application of the sequentially laminated, permanent magnet. For example, in cases of high speed machines, more dielectric layers are preferred. The thickness of the rare earth, permanent magnet layers are also determined by the application, and are usually not less that 500 µm.

Consolidation methods in the methods of manufacture of the present invention required to achieve full density of the sequentially laminated, permanent magnet include: sintering, hot pressing, die upsetting, spark plasma sintering, microwave sintering, infrared sintering, combustion driven compaction and combinations thereof. These are referenced in Examples 1 through 8 and in Examples 9 through 17 set forth in Table 2.

Delamination of the magnets of the present invention can be controlled by the thickness of the dielectric layer and the mechanical strength of the sequentially laminated, permanent magnet. The improved mechanical strength of the rare earth, permanent magnets of the invention is determined, in part, by the bonding strength between the transition and/or diffusion reaction layers and the permanent magnet layers. Breakage of the laminated structures during processing is controlled by the methods of manufacture of the present invention by introducing different morphologies into the green compact, for example, into (1) partial layers near one of the magnetic poles of the magnet, and (2) partial layers in the center of the magnet.

Thus, one embodiment of the methods of manufacture of the present invention is to produce a laminated, rare earth, permanent magnet, having improved electrical resistivity, comprising sequential layers of (1) rare earth, permanent magnets and (2) dielectrics layers where each dielectric layer is surrounded by transition and/or diffusion reaction layers that interface with permanent magnet layers.

Another embodiment of the methods of manufacture of the invention is a laminated, rare earth, permanent magnet having improved electrical resistivity, comprising sequential layers of rare earth permanent magnet and dielectric layers surrounded by transition and/or diffusion reaction layers, wherein said rare earth, permanent magnet layers are selected from the group of intermetallic compounds consisting of:
RE(Co,Fe,Cu,Zr)$_z$,
RE-TM-B,
RE$_2$TM$_{14}$B,
RE-Co
RE$_2$Co$_{17}$,
RECo$_5$ and
combinations thereof;
wherein z=6 to 9; RE is selected from the group consisting of rare earth elements including yttrium and mixtures thereof, and TM is selected from a group of transition metals consisting but not limited to Fe, Co and other transition metal elements, and said laminated, rare earth, permanent magnet structure includes sequential layers dielectric surrounded by selected diffusion reaction interface layers, transition layers and combinations thereof.

Yet another embodiment of the invention is a method of manufacturing a laminated, rare earth, permanent magnet, having improved electrical resistivity and improved mechanical strength without compromising magnetic properties comprising sequential layers of rare earth, permanent magnet and sulfide-based dielectric layers surrounded by transition and/or diffusion reaction layers and combinations thereof; wherein said dielectric material is sulfide-based and is selected from the group consisting of:
S or S/F-based dielectric/semiconductor materials, wherein sulfides refer to: Al$_2$S$_3$, Sb$_2$S$_3$, As$_2$S$_3$, BaS, BeS, Bi$_2$S$_3$, B$_2$S$_3$, CdS, CaS, CeS, Ce$_2$S$_3$, WS, Cr$_2$S$_3$, CoS, CoS$_2$, Cu$_2$S, CuS, Dy$_2$S$_3$, Er$_2$S$_3$, EuS, Gd$_2$S$_3$, Ga$_2$S$_3$, GeS, GeS$_2$, HfS$_2$, Ho$_2$S$_3$, In$_2$S, InS, FeS, FeS$_2$, La$_2$S$_3$, LaS$_2$, La$_2$O$_2$S, PbS, Li$_2$S, MgS, MnS, HgS, MoS$_2$, Nd$_2$S$_3$, NiS, NdS, K$_2$S, Pr$_2$S$_3$, Sm$_2$S$_3$, Sc$_2$S$_3$, SiS$_2$, Ag$_2$S, Na$_2$S, SrS, Tb$_2$S, Tl$_2$S, ThS$_2$, Tm$_2$S$_3$, SnS, SnS$_2$, TiS$_2$, WS$_2$, US$_2$, V$_2$S$_3$, Yb$_2$S$_3$, Y$_2$S$_3$, Y$_2$S$_3$, Y$_2$O$_2$S, ZnS, ZrS$_2$ and combinations thereof or a combination of any of the foregoing with sulfides, oxysulfides, mixtures of sulfides, mixtures of sulfides with oxyfluorides, mixtures of sulfides and fluorides, mixtures of sulfides, fluorides, oxysulfides and/or mixtures oxyfluorides, and/or combinations of the above with rare earth alloys.

In another embodiment of the methods of manufacture of the present invention, a sequentially laminated, rare earth, permanent magnet, as described herein, the thickness of said sulfide-based dielectric layer is less than about 2 mm and more preferably less than 500 µm.

Yet another embodiment of a method of manufacture of the present invention calls for a sequentially laminated, rare earth, permanent magnet as described herein, wherein said rare earth permanent magnet material layer is represented by the chemical formula:

$$RE_{11.7+x}TM_{88.3-x-y}B_y$$

where x=0 to 5, y=5 to 7; RE is selected from the group consisting of rare earth elements including Nd, Pr, Dy and Tb; and TM is selected from the group consisting of transition metal elements including Fe, Co, Cu, Ga and Al.

Another embodiment of the invention is a method for sequentially laminating rare earth magnets, as described herein, wherein said transition layer consists of rare earth rich alloys represented by the formula:

$$RE_{11.7+x}TM_{88.3-x-y}B_y$$

where x is from 5 to 80, y is from 0 and 6; RE is selected from the group consisting of rare earth elements including Nd, Pr, Dy and Tb; and TM is selected from the group consisting of transition metal elements including Fe, Co, Cu, Ga and Al.

Yet another embodiment of the invention is a method for sequentially laminating rare earth, permanent magnets, as described herein, wherein said rare earth, permanent magnet material is represented by the formula:

$$RE(Co_uFe_vCu_wZr_h)_z$$

wherein u is from about 0.5 to 0.8, v is from about 0.1 to 0.35, w is from about 0.01 to 0.2, h is from about 0.01 to 0.05, and z is from about 6 to 9; and wherein RE is selected from the group consisting of Sm, Gd, Er, Tb, Pr, Dy and combinations thereof.

Another embodiment of the invention is a method for sequentially laminating rare earth, permanent magnets, as described herein, wherein said rare earth magnet material is represented by the formula:

$$RECo_x$$

where x is from 4 to 6 and RE represents rare earth elements including Sm, Gd, Er, Tb, Pr, and Dy and mixtures thereof, while other metallic or non-metallic elements are optional and should not exceed 10 atomic %.

Yet another embodiment of the methods of the present invention calls for a sequentially laminated, rare earth permanent magnet as described herein, wherein said transition layer is a rare earth rich alloy having the formula:

$$RE(Co_uFe_vCu_wZr_h)_z$$

wherein u=0 to 0.8, v=0 to 0.35, w=0 to 0.20, h=0 to 0.05, z=1 to 7; and RE is selected from the group consisting of rare earth elements and mixtures thereof.

Another embodiment of the methods of manufacture of the present invention calls for a sequentially laminated, rare earth, permanent magnet as described herein, wherein said transition layer is a rare earth rich alloy having the formula:

$$RECo_x$$

where x is from 1 to 4 and RE is selected from the group consisting of rare earth elements and mixtures thereof.

Yet another embodiment of the methods of manufacture of the invention calls for a sequentially laminated, rare earth, permanent magnet as described herein, wherein said sulfide-based dielectric is selected from the group consisting of:
Sulfides,
Oxysulfides,
Sulfides and oxyfluorides,
Mixtures of sulfides,
Mixtures of sulfides and fluorides,
Mixtures of sulfides, fluorides, oxysulfides and/or oxyfluorides, and
combinations thereof;
where the sulfides refers to: Al$_2$S$_3$, Sb$_2$S$_3$, As$_2$S$_3$, BaS, BeS, Bi$_2$S$_3$, B$_2$S$_3$, CdS, CaS, CeS, Ce$_2$S$_3$, Ce$_2$O$_2$, WS, Cr$_2$S$_3$, CoS, CoS$_2$, Cu$_2$S, CuS, Dy$_2$S$_3$, Er$_2$S$_3$, EuS, Gd$_2$S$_3$, Ga$_2$S$_3$, GeS, GeS$_2$, HfS$_2$, Ho$_2$S$_3$, In$_2$S, InS, FeS, FeS$_2$, La$_2$S$_3$, LaS$_2$, La$_2$O$_2$S, PbS, Li$_2$S, MgS, MnS, HgS, MoS$_2$, Nd$_2$S$_3$, NiS, NdS, K$_2$S, Pr$_2$S$_3$, Sm$_2$S$_3$, Sc$_2$S$_3$, SiS$_2$, Ag$_2$S, Na$_2$S, SrS, Tb$_2$S, Tl$_2$S, ThS$_2$, Tm$_2$S$_3$, SnS, SnS$_2$, TiS$_2$, WS$_2$, US$_2$, V$_2$S$_3$, Yb$_2$S$_3$, Y$_2$S$_3$, Y$_2$S$_3$, Y$_2$O$_2$S, ZnS and ZrS$_2$ and combinations thereof.

These sulfide-based dielectrics can include rare earth rich alloys having the formula:

$$RE_{11.7+x}TM_{88.3-x-y}B_y$$

where x=5 to 80, y=0 to 6: RE is selected from the group consisting of rare earth elements selected from the group consisting of Nd, Pr, Dy, and Tb; and TM is selected from the group consisting of transition metal elements Fe, Co, Cu, Ga, and Al.

Another embodiment of the method of manufacture of the invention is to sequentially laminate rare earth, permanent magnets, as described herein, wherein said sulfide-based dielectric layer contains at least 30 weight % of said sulfide-based, dielectric material with the balance comprising a rare earth rich alloy having the formula:

$$RE(Co_u Fe_v Cu_w Zr_h)_z$$

wherein u=0 to 0.8, v=0 to 0.35, w=0 to 0.20, h=0 to 0.05, z=1 to 7; and RE is selected from the group consisting of rare earth elements consisting of Nd, Pr, Dy, and Tb.

Yet another embodiment of the methods of manufacture of the present invention calls for a sequentially laminated, rare earth, permanent magnet as described herein, wherein said sulfide-based, dielectric layer comprises at least 30 weight % of said sulfide-based, dielectric material with the balance comprising a rare earth rich alloy having the formula:

$$RECo_x$$

wherein x=1 to 4 and RE represents a rare earth element.

Another embodiment of the methods of manufacture of the present invention is directed to improvements in high performance, electric motors and generators having improved mechanical strength and electrical resistivity with no compromise in magnetic properties using rare earth magnets of the invention with reduced eddy current losses comprising sequentially laminated, rare earth, permanent magnet layers and sulfide-based dielectrics surrounded by transition and/or diffusion reaction layers.

Yet another embodiment of the methods of manufacture of the present invention is directed to improvements in high-performance, rotating machines by reducing eddy current losses with improved mechanical strength with no compromise in magnetic properties through the use of sequentially laminated, rare earth, permanent magnet layers, separated from sulfide-based, dielectric layers by transition and/or diffusion reaction layers.

Another embodiment of the methods of manufacture of the present invention is a sequentially laminated, rare earth, permanent magnet as described herein, wherein the diffusion reaction layers are arranged as shown in FIG. 3 and discussed in Example 2; wherein the diffusion reaction layers can be discontinuous, non-planar and have irregular thickness.

Figure 5:
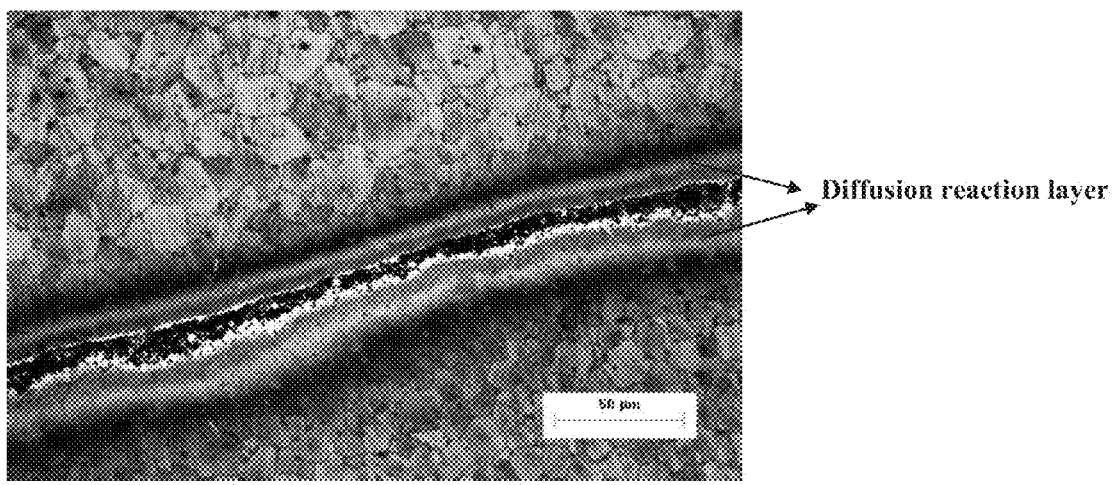
FIG. 5 is an optical microphotograph showing two diffusion reaction layers separating a dielectric layer from permanent magnet layers produced according to the methods of manufacture of the present invention.
Figure 6:
FIG. 6 is an optical microphotograph showing the thickness and uniformity of a sulfide-based, dielectric layer produced according to the methods of manufacture of the present invention.

Yet another embodiment of the methods of manufacture of the present invention is a sequentially laminated, rare earth, permanent magnet as described herein, wherein said laminated layers are arranged as shown in FIGS. 5 and 6 and described in Example 3. Note: Said layers may be discontinuous, non-planar and have irregular thickness.

Figure 8:
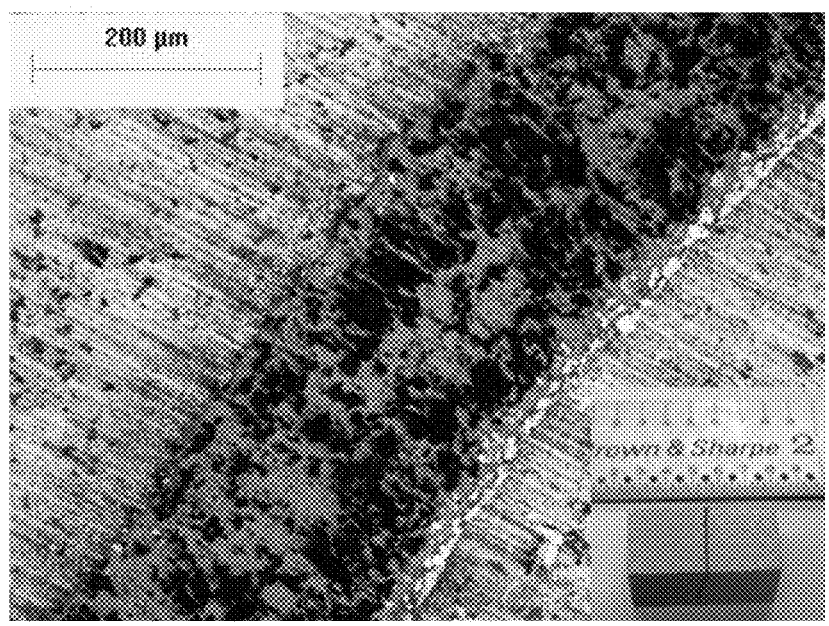
FIG. 8 insert shows a dielectric layer in a sequentially laminated, rare earth, permanent magnet of the invention produced according to the methods of the present invention. This optical microphotograph shows the thickness and uniformity of the sulfide-based, dielectric layer.

Another embodiment of the methods of manufacture of the present invention calls for a sequentially laminated, rare earth, permanent magnet, as described herein, wherein said laminated layers are arranged as shown in FIG. 8 and discussed in Example 4. Note: Said layers may be discontinuous, non-planar and have irregular thickness.

Figure 10:
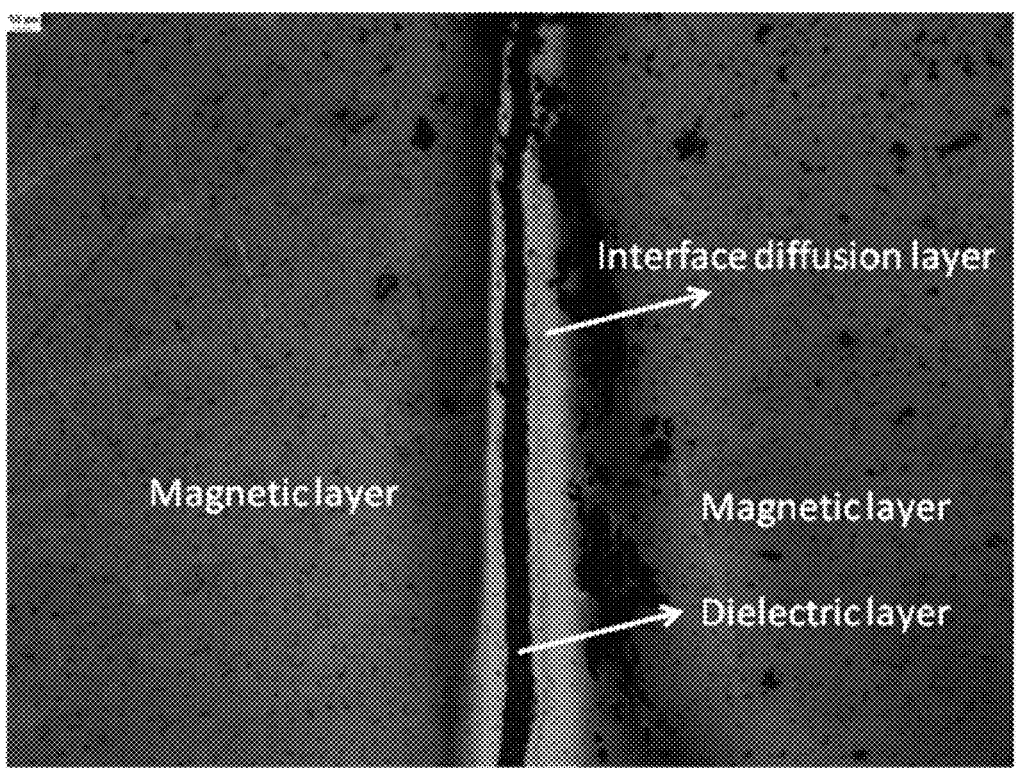
FIG. 10 is an optical microphotograph showing the thickness and uniformity of a sulfide-based dielectric layer which is separated from permanent magnet layers by diffusion reaction layers according to the methods of manufacture of the present invention.

Yet another embodiment of the methods of manufacture of the present invention is a sequentially laminated, rare earth, permanent magnet, as described herein, wherein said laminated layers are arranged as shown in FIG. 10 and discussed in Example 5. Note: Said layers may be discontinuous, non-planar and have irregular thickness.

Processing Methods

The methods of manufacturing of the present invention for producing sequentially laminated, rare earth, permanent magnets with high electrical resistivity and improved mechanical strength with no compromise in magnetic properties includes pressing sequential layers as illustrated in FIGS. 1, 2, 12 and 13; accompanied by thermal processing to reach full density. The sequential layers of the laminated, permanent magnet should be preferably perpendicular to the plane of the eddy currents and parallel with the direction of the magnetization of the magnet. Suitable thermal processing methods of the present invention are selected from the group consisting of sintering, hot pressing, die upsetting, spark plasma sintering, microwave sintering, infrared sintering, combustion driven compaction and combinations thereof.

The permanent magnet powder for the methods of the present invention may be prepared by coarsely pulverizing the precursor ingots produced by melting and casting the starting material and pulverizing in a jet mill, ball mill, etc., to particles having an average particle size from 1 μm to 10 μm, preferably from 3 μm to 6 μm.

In one process for producing the sequentially laminated magnets according to the methods of the present invention, submicron sized sulfide and fluoride particles used in the dielectric layers of the sequentially laminated, permanent magnets of the invention are prepared using either top down or bottom up manufacturing. For example, top down approaches include mechanical milling, ball milling, mechanical alloying, low energy ball milling and high energy ball milling, and combinations thereof. In contrast, bottom up approaches include various chemical approaches followed by annealing.

In the various processes of the present invention, sulfide-based, dielectric particles suitable for the dielectric laminate of the present invention can be prepared by various methods, including:

1. Homogeneous gas phase reactions with volatile sulfur precursors
2. Gas—Solid reactions
3. Reactions with elemental sulfur
4. Solution Processes
5. Solvated Elemental Sulfur
6. Homogeneous Precipitation
7. Flux driven reactions
8. Reduction Process
9. Thermal decomposition of Dithiolato Complexes
10. Non-Aqueous Solvent Routes using metal alkyls and Sulfur precursors
11. Ceramic Method (High Temperature Solid State Synthesis)
12. Sulfidized Sol-Gel derived Precursors Dielectric fluoride particles suitable for use in combination with sulfide-based dielectrics in the process of the present invention can be prepared using the following methods:

Gas solid reactions
Solution processes
Co-precipitation processes
Ball milling processes Particle sizes of referenced sulfide-based dielectric particles can be further reduced, according to the methods of manufacture of the present invention, by a variety of milling techniques and ultrasonic processes.

In the processes of the present invention used to manufacture the sequentially laminated magnets, colloidal or submicron sized sulfide particles are mixed with polar or non-polar solvents at different concentrations based on the density of the dielectric material and the volume required to produce a particular dielectric layer thickness on the green compact pressed magnetic materials layer. The dielectric materials are introduced onto the surface of the pressed green, compact, thick magnetic layers using a semi-automatic, flow rate controlled, sprayer which controls the flow rate of the colloidal dielectric particles and as well as the as the area to be sprayed based on the different sizes of the nozzle used during spraying. Thickness of the dielectric layer is controlled by the concentration of the dielectric material in the solvent used during the spray process. The sprayed dielectric layers thickness on the pressed green magnets varies from about 1 µm to 1000 µm and preferably from about 1 µm to 500 µm and particularly preferred from about 10 µm to 400 µm. Subsequently $Sm(Co,Fe,Cu,Zr)_z$ magnetic particles are sprayed onto the coated magnet in thick layers which are pressed to make a green compact magnetic layer. Second and third dielectric layers with comparable or different thicknesses can be added following the above procedure. The number of sulfide-based dielectric layers is determined by specific applications of the sequentially laminated, permanent magnet produced according to the methods of the invention.

The green, compact, laminated magnets produced according to the methods of the invention are formed by pressing the laminates under a pressure of from 500 $kgf/cm^2$ to 3000 $kgf/cm^2$ in a magnetic field of from 1 kOe to 40 kOe. The green, compact, sequentially laminated, permanent magnet is then consolidated by sintering at from 100° C. to 1250° C. for from 1 to 4 hours in vacuum or in an inert gas atmosphere such as an Ar atmosphere. The sintered product may be further homogenized and heat-treated to develop optimum magnetic properties.

Methods of Manufacture

The present invention is directed to methods for laminating high electrical resistivity, rare earth, permanent magnets consisting of sequential layers having different chemical compositions, each of which has a different function, namely:
  (a) rare earth, permanent magnet layers,
  (b) sulfide-based, dielectric layers surrounded by
  (c) transition and/or diffusion reaction layers.

Rare Earth Permanent Magnet Layers

Rare earth permanent magnet layers are preferably comprised of rare earth permanent magnets, including RE-Fe—B and RE-Co-based permanent magnets, wherein RE is at least one rare earth element including Y (yttrium). Other rare earth, permanent magnet compositions suitable for use in the methods of present invention are discussed below.

In a preferred embodiment, the rare earth magnet layer is represented by RE-Fe(M)-B comprised of from 10 weight % to 40 weight % of RE and from 0.5 weight % to 5 weight % of B (boron) with the balance of Fe(M) comprising Nd, Pr, Dy and Tb, with Nd particularly preferred. Further, it is preferred to use Dy up to 50 weight %, preferably up to 30 weight % of the total amount of RE. In an effort to improve the coercive force, M represents other optional metallic elements, such as Nb, Al, Ga and Cu. The addition of Co improves the permanent magnet, corrosion resistance and thermal stability. Co may be added up to 25 weight % based on the total amount of the RE-Fe—B-based magnet, as a replacement for Fe. An additional amount exceeding 25 weight % of Co unfavorably reduces the residual magnetic flux density, as well as the intrinsic coercive force. Nb is effective for preventing the overgrowth of crystals during processing while enhancing thermal stability. Since an excess amount of Nb reduces the residual magnetic flux density, Nb is preferably limited to up to 5 weight % based on the total amount of the RE-Fe—B-based magnet.

As stated above, the rare earth magnet layer can also include $RE_2Co_{17}$-based magnets with from 10 weight % to 35 weight % of RE, 30 weight % or less of Fe, from 1 weight % to 10 weight % of Cu, from 0.1 weight % to 5 weight % of Zr, an optional small amount of other metallic elements such as Ti and Hf, with the balance comprising Co. The RE-Co-based, rare earth, permanent magnet is preferred based on its cellular microstructure consisting of cells with 2:17 rhombohedral type crystallographic structure and cell boundaries with 1:5 hexagonal crystallographic structures. In this magnet, the rare earth element is preferably Sm, along with optional other rare earth elements such as Ce, Er, Tb, Dy, Pr and Gd. When the amount of RE is lower than 10 weight %, the coercive force is low, and the residual magnetic flux density is reduced when RE exceeds 39 weight %. Although a high residual induction, Br, can be achieved by the addition of Fe, a sufficient coercive force can not be obtained when the amount exceeds 30 weight %. It is preferable to add Fe at least 5 weight % in order to improve Br. Copper, Cu, contributes to improving the coercive force. The addition of less than 1 weight % Cu shows improvement, while the residual magnetic flux density and coercive force are each reduced when the addition of Cu exceeds about 10 weight %.

The rare earth, permanent magnet, laminate layer, produced by the methods of the present invention, can also comprise $RECo_5$-based magnet with from 25 weight % to 45 weight % of RE, and the balance Co. RE is preferably Sm along with other rare earth elements.

Other metallic or non-metallic elements useful in the methods of the present invention can be present in Nd—Fe—B and Sm—Co based sequentially laminated magnets at preferably less than 10 weight %. It is understood that the RE-Fe—B-based magnets and RE-Co-based magnets used in the sequential laminating process of the present invention may include inevitable impurities such as C, N, O, Al, Si, Mn, Cr and combinations thereof.

Dielectric Layers

The sulfide-based dielectric layer, suitable for the methods of manufacture of the present invention, consists of substances selected from the group consisting of sulfide-based dielectric/semiconductor materials; where the sulfide-base includes $Al_2S_3$, $Sb_2S_3$, $As_2S_3$, BaS, BeS, $Bi_2S_3$, $B_2S_3$, CdS, CaS, CeS, $Ce_2S_3$, WS, $Cr_2S_3$, CoS, $CoS_2$, $Cu_2S$, CuS, $Dy_2S_3$, $Er_2S_3$, EuS, $Gd_2S_3$, $Ga_2S_3$, GeS, $GeS_2$, $HfS_2$, $Ho_2S_3$, $In_2S$, InS, FeS, $FeS_2$, $La_2S_3$, $LaS_2$, $La_2O_2S$, PbS, $Li_2S$, MgS, MnS, HgS, $MoS_2$, $Nd_2S_3$, NiS, NdS, $K_2S$, $Pr_2S_3$, $Sm_2S_3$, $Sc_2S_3$, $SiS_2$, $Ag_2S$, $Na_2S$, SrS, $Tb_2S$, $Tl_2S$, $ThS_2$, $Tm_2S_3$, SnS, $SnS_2$, $TiS_2$, $WS_2$, $US_2$, $V_2S_3$, $Yb_2S_3$, $Y_2S_3$, $Y_2S_3$, $Y_2O_2S$, ZnS and $ZrS_2$ or combinations of any of these materials with sulfides, oxysulfides, sulfides and oxysulfides, mixtures of sulfides, sulfides and fluorides, and mixtures of sulfides, fluorides, oxy sulfides and/or oxyfluorides, oxysulfides, fluorides, oxyfluorides, mixtures of sulfides and fluorides.

The high electrical resistivity, sulfide-base, dielectric layers used in the methods of the present invention include mixtures with rare earth elements RE; wherein RE is selected from the group consisting of rare earth elements and mixtures thereof, and rare earth rich alloys. These rare earth rich alloys are different for different types of laminate layers. The following are some examples of the rare earth rich alloys suitable for inclusion in the sulfide-based, dielectric layer:

(1) In the case of RE-Fe(M)-B magnets, the rare earth, rich alloy, dielectric mixture is $RE_{11.7+x}TM_{88.3-x-y}B_y$, where x=5 to 80, y=0 to 6, RE is selected from the group consisting of rare earth elements such as Nd, Pr, Dy, and Tb and combinations thereof, and TM is selected from the group consisting of transition metal elements, Fe, Co, Cu, Ga, and A and combinations thereof.

(2) In the case of $RE(Co_uFe_vCu_wZr_h)_z$ magnets, the rare earth rich alloy/dielectric mixtures is $RE(Co_uFe_vCu_wZr_h)_z$ (u=0 to 0.8, v=0 to 0.35, w=0 to 0.10, h=0 to 0.05, z=1 to 7).

(3) In the case of $RECo_x$ magnets, the rare earth, rich alloy, dielectric mixture is $RECo_x$ (x=4 to 6), where RE is preferably Sm with optional other rare earth elements such as Gd, Er, Tb, Pr, and Dy, and other metallic or non-metallic elements are optional and should not be over 10 weight %.

The Transition and/or Diffusion Reaction Layers

The transition and/or diffusion reaction layers are added or produced during the manufacturing process of the present invention to compensate for the reactions that takes place between the sulfide-based, dielectric layers and the rare earth, permanent magnet layers. These transition and/or diffusion reaction layers vary in composition depending on the types of magnet layers and dielectric layers present. The following are examples of rare earth, rich alloys suitable in the method of the present invention for producing transition and/or diffusion reaction layers:

(1) In the case of RE-Fe(M)-B magnets, suitable rare earth rich alloys include: $RE_{11.7+x}TM_{88.3-x-y}B_y$, where x=5 to 80, y=0 to 6, RE is selected from the group consisting of rare earth elements such as Nd, Pr, Dy, and Tb, and TM is selected from the group consisting of transition metal elements, Fe, Co, Cu, Ga, and A.

(2) In the case of $RE(Co_uFe_vCu_wZr_h)_z$ magnets, suitable rare earth rich alloys include: $RE(Co_uFe_vCu_wZr_h)_z$ (u=0 to 0.8, v=0 to 0.35, w=0 to 0.10, h=0 to 0.05, z=1 to 7).

(3) In the case of $RECo_x$ magnets, suitable rare earth rich alloys include: $RECo_x$ (x=4 to 6), where RE is preferably Sm with optional other rare earth elements such as Gd, Er, Tb, Pr, and Dy, and other metallic or non-metallic elements are optional and should not be over 10 weight %.

EXAMPLES

The unexpected enhanced electrical resistivity and improved mechanical strength properties combined with excellent magnetic properties of the sequentially laminated, rare earth, permanent magnets produced according to the methods of the present invention are further described in Examples 1 through 17, Tables 1 and 2, and FIGS. 1 through 17 of the Drawings.

Example 1

FIGS. 1 and 2

An anisotropic $Sm(Co,Fe,Cu,Zr)_z/Sm_2S_3$ sequentially laminated magnet with increased electrical resistivity was synthesized, according to the methods of the present invention, by regular powder metallurgic processes consisting of sintering at from 1200° C. to 1220° C., solution treatment at from 1160° C. to 1180° C. and aging at from 830° C. to 890° C. This step was followed by a slow cooling to 400° C. The sequentially laminated, anisotropic magnet consisting of three sequential $Sm(Co,Fe,Cu,Zr)_z$ layers and three sequential $Sm_2S_3$ layers, shown in FIG. 1, was produced by a one-step sintering process.

The photograph set out in FIG. 2 shows the thickness and uniformity of the sulfide-based, dielectric layer of a sequentially laminated anisotropic magnet produced according to the methods of the present invention. In the process of the present invention, this thickness and uniformity of sulfide-based, dielectric layers is controlled by spraying a colloidal solution of dielectric submicron $Sm_2S_3$ onto compacted magnetic $Sm(Co,Fe,Cu,Zr)_z$ layers.

Example 2

Figure 4:
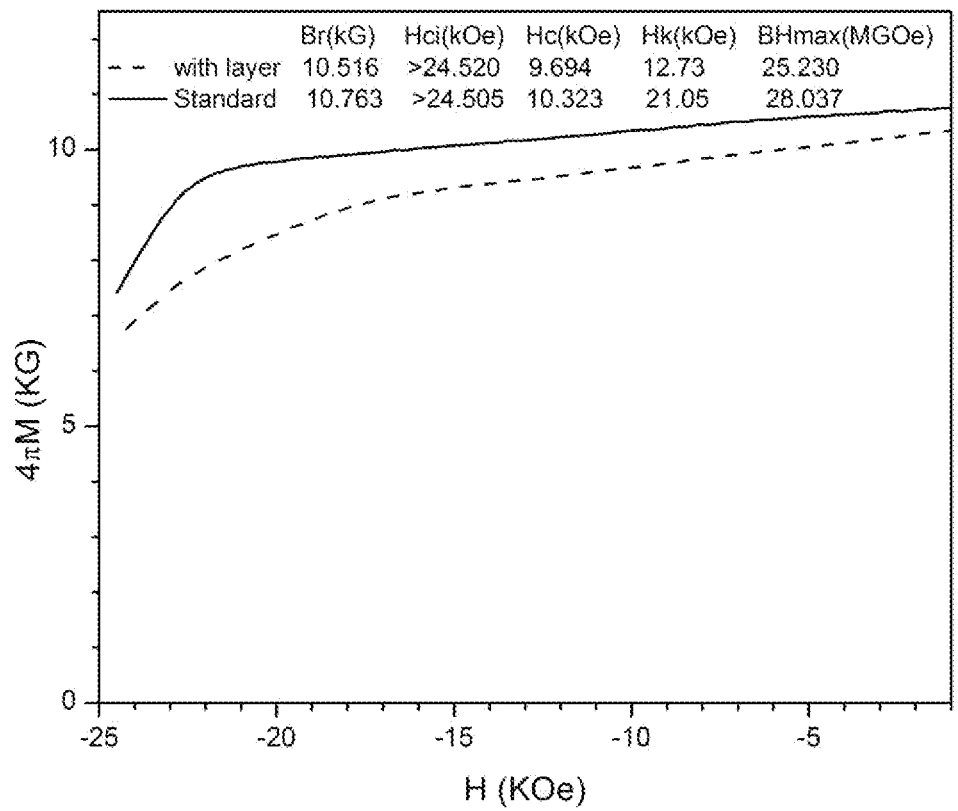
FIG. 4 shows the demagnetization curve for the high electrical resistivity sequentially laminated permanent magnet shown in FIG. 3.

FIGS. 3 and 4

FIG. 3 shows an optical micrograph of a $Sm_2S_3$ colloidal layer deposited on a $Sm(Co,Fe,Cu,Zr)_z$ sequentially laminated magnet, produced according to the methods of the present invention, after polishing and etching. The $Sm_2S_3$ dielectric layer is about 190 μm thick. The magnetic layers and interface diffusion reaction layers separating the sulfide-based, dielectric layer from the permanent magnet layers are clearly shown. The demagnetization curve for this sequentially laminated, permanent magnet, produced according to the methods of the invention compared to conventional non-layered magnets indicates comparable magnetic properties. The magnetic properties of the sequentially laminated $Sm(Co,Fe,Cu,Zr)_z/Sm_2S_3$ magnet shown in FIG. 3 were reported in FIG. 4, as follows:

Residual induction: Br=10.516 kG
Intrinsic coercivity: Hci>24.5 kOe
Maximum energy product: (BH)max=25.5 MGOe The electrical resistivity of this sequentially laminated, rare earth, permanent magnet produced according to the methods of the invention was unexpectedly increased by approximately 32 times (about 3000%) compared to a standard permanent magnet. Improved mechanical strength was also observed.

Example 3

FIG. 5

FIG. 5 shows an optical micrograph of a $Sm_2S_3$ colloidal, dielectric layer deposited on a $Sm(Co,Fe,Cu,Zr)_z$ sequentially laminated magnet, produced according to the method of the present invention, after polishing and etching. The $Sm_2S_3$ dielectric layer is about 30 μm thick. The magnetic layers and interface diffusion reaction layers separating the sulfide-based, dielectric layer from the permanent magnet layers are clearly shown. The demagnetization curve for this sequentially laminated, permanent magnet produced according to the methods of the invention compared to conventional non-layered magnets indicates comparable magnetic properties. The magnetic properties of the laminated $Sm(Co,Fe,Cu,Zr)_z/Sm_2S_3$ magnet shown in FIG. 5 were as follows:

Residual induction: Br=10.73 kG
Intrinsic coercivity: Hci>24.5 kOe
Maximum energy product: (BH)max=25.5 MGOe The electrical resistivity of this sequentially laminated, permanent magnet, produced according to the methods of the invention, was unexpectedly increased by approximately 35 times (about 3000%) compared to a standard permanent magnet. Improved mechanical strength was also observed.

Example 4

Figure 7:
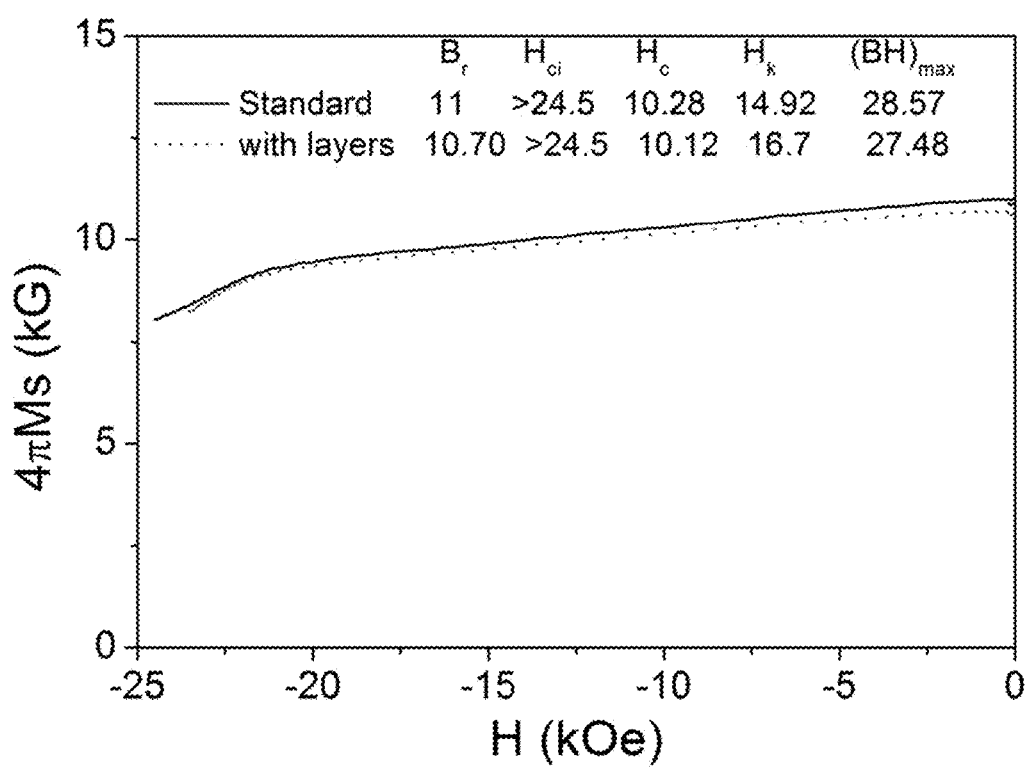
FIG. 7 shows the demagnetization curve for the high electrical resistivity, sequentially laminated, permanent magnet shown in FIG. 6.

FIGS. 6 and 7

An anisotropic $Sm(Co,Fe,Cu,Zr)_z/Sm_2S_3$ sequentially laminated, permanent magnet produced according to methods of the invention with increased electrical resistivity was produced using regular powder metallurgical processes consisting of sintering at 1195° C., solution treatment at 1180° C. and aging at 850° C. followed by a slow cooling to 400° C.

This anisotropic, sequentially laminated, permanent magnet consisting of sequential $Sm(Co,Fe,Cu,Zr)_z$ and $Sm_2S_3$ dielectric layers was produced by a one-step sintering process of the present invention. As shown in optical micrograph (unetched) FIG. 6. The thickness and uniformity of the sulfide-based, dielectric layers of this sequentially laminated, anisotropic, permanent magnet can be controlled by the process of the present invention; by spraying a colloidal solution of dielectric, submicron $Sm_2S_3$ onto the surface of the compacted magnetic $Sm(Co,Fe,Cu,Zr)_z$ layer. The thickness of the $Sm_2S_3$ dielectric layer shown inn FIG. 6 is about 50 μm.

FIG. 7 shows the demagnetization curve for the sequentially laminated magnet of FIG. 6 compared to the demagnetization curve for a conventional non-laminated magnet. The magnetic properties of the sequentially laminated $Sm(Co,Fe,Cu,Zr)_z/Sm_2S_3$ magnet produced according to methods of the present invention shown in FIG. 6 are detailed in FIG. 7.

Compared to a conventional magnet matrix, the electrical resistivity of the sequentially laminated magnet produced according to the methods of the invention as shown in FIG. 6 was increased unexpectedly by approximately 5 times, i.e., to about 520%. Improved mechanical strength was also observed.

Example 5

Figure 9:
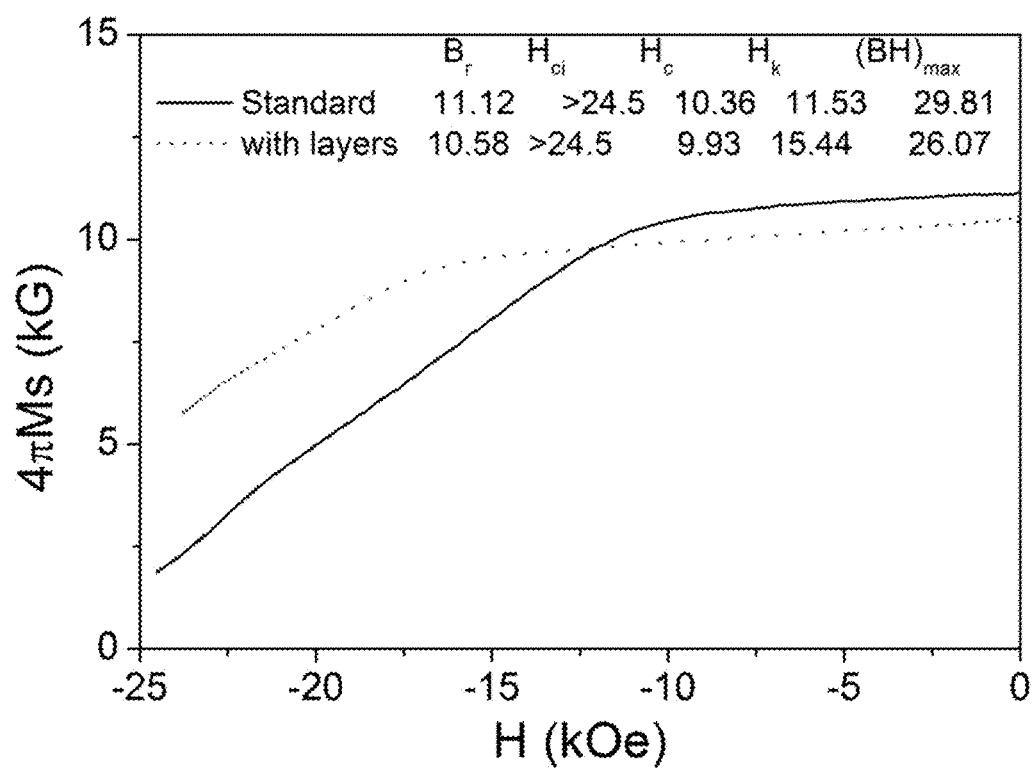
FIG. 9 shows the demagnetization curve for the high electrical resistivity, sequentially laminated magnet of the invention shown in FIG. 8.

FIGS. 8 and 9

An anisotropic $Sm(Co,Fe,Cu,Zr)_z/Sm_2S_3$ sequentially laminated, permanent magnet with increased electrical resistivity was produced by a method of manufacture of the present invention using a powder metallurgical process consisting of (a) sintering at 1195° C., (b) solution treatment at 1180° C., (c) aging at 850° C., followed by (d) a slow cooling 400° C.

Sequentially laminated, anisotropic magnets of the present invention consisting of sequential $Sm(Co,Fe,Cu,Zr)_z$ and $Sm_2S_3$ layers were produced by a one-step sintering process of the present invention. As shown in the optical micrograph set out in FIG. 8, the thickness and uniformity of the sulfide-based, dielectric layers of the sequentially laminated, anisotropic magnet can be successfully controlled by a manufacturing method of the present invention comprising spraying a colloidal solution of the dielectric submicron $Sm_2S_3$ onto the surface of the compacted magnetic $Sm(Co,Fe,Cu,Zr)_z$ layer. The thickness of the $Sm_2S_3$ dielectric layer of the sequentially laminated, permanent magnet produced according to the present invention is about 60 µm.

FIG. 9 shows the demagnetization curve for this sequentially laminated magnet produced according to the methods of the present invention shown in FIG. 8 compared with the conventional permanent magnets.

The electrical resistivity of the sequentially laminated magnet produced according to the method of the present invention was unexpectedly increased approximately 12 times over the magnet matrix, i.e., by about 1190%. Improved mechanical strength was also observed.

Example 6

Figure 11:
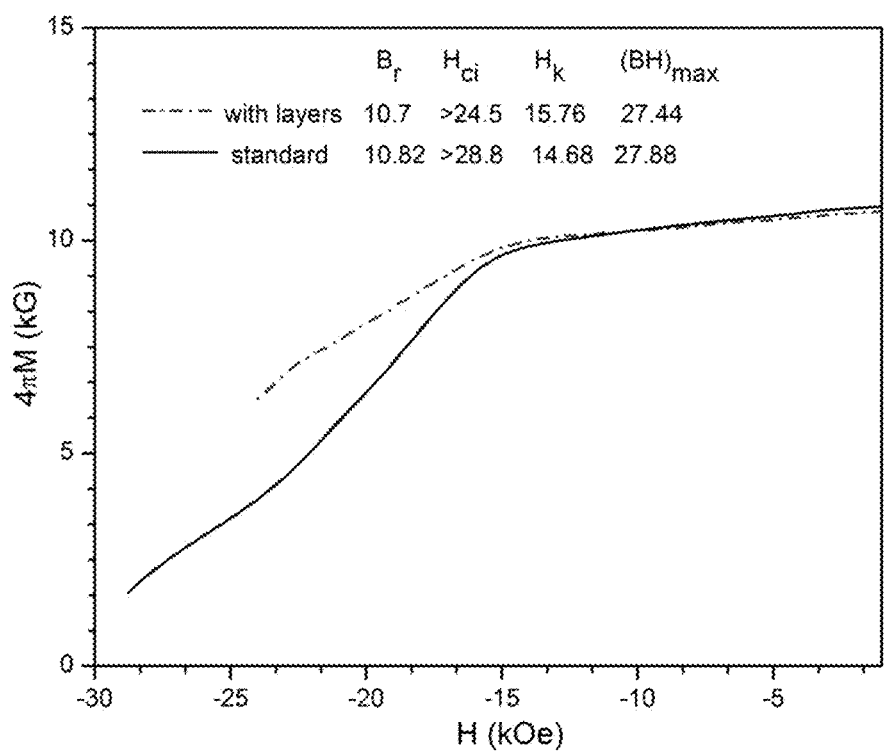
FIG. 11 shows the demagnetization, permanent curve for the sequentially laminated magnet of the invention shown in FIG. 10.
Figure 12:
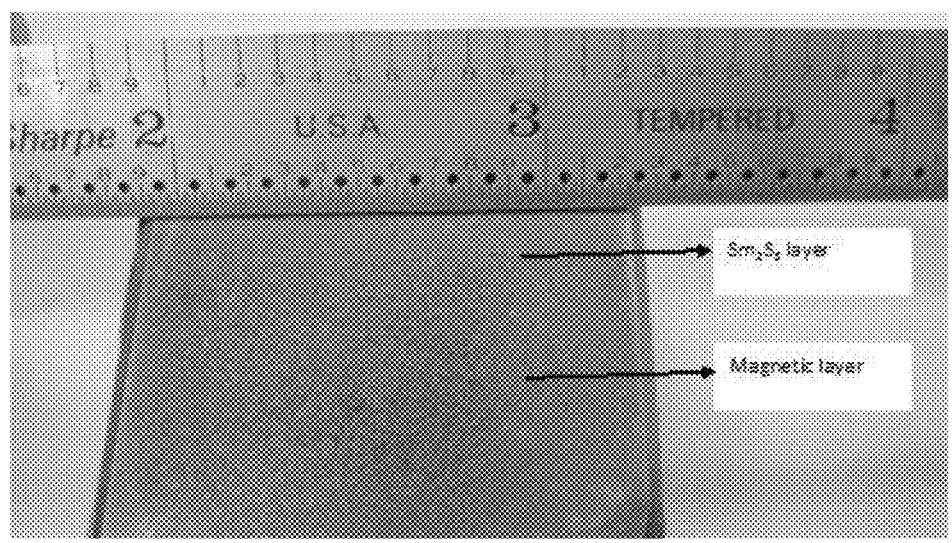
FIG. 12 is a photograph of a sequentially laminated, permanent magnet produced according to the methods of manufacture of the invention with a $Sm_2S_3$ dielectric layer surrounded by diffusion reaction layers and permanent magnet layers.

FIGS. 10 through 12

An anisotropic $Sm(Co,Fe,Cu,Zr)_z/Sm_2S_3$ sequentially laminated, rare earth, permanent magnet with increased electrical resistivity and improved mechanical strength was developed by a method of the present invention comprising a powder metallurgical processes consisting of (a) sintering at 1195° C., (b) solution treatment at 1180° C., (c) aging at 850° C., followed by (d) a slow cooling 400° C. Sequentially laminated, anisotropic magnets of the present invention consisting of sequential $Sm(Co,Fe,Cu,Zr)_z$ and $Sm_2S_3$ layers surrounded by diffusion reaction layers were by a one-step sintering process.

As shown in the optical micrograph set out in FIG. 10, the thickness and uniformity of the dielectric layers of sequentially laminated, anisotropic magnet produced according to the methods of the invention are successfully controlled by the manufacturing process of the present invention comprising: spraying a colloidal solution of the dielectric submicron $Sm_2S_3$ onto the compacted magnetic $Sm(Co,Fe,Cu,Zr)_z$ layer. The resulting $Sm_2S_3$ dielectric layer is surrounded by a diffusion reaction layer, was about 40 µm thick. FIG. 10 also shows the interfacial diffusion reaction layers on either side of the dielectric layer, thereby effectively separating the sulfide-based, dielectric layer from the magnetic layers, resulting in an electrical resistivity increase of about 1190% over the magnet matrix. Improved mechanical strength was also observed.

FIG. 11 shows the demagnetization curve for the sequentially laminated magnet shown in FIG. 10 compared with the demagnetization curve for conventional, non-layered, permanent magnets. FIG. 12 shows single layers of $Sm(Co,Fe,Cu,Zr)_z$ and $Sm_2S_3$ dielectric layer of the sequentially laminated, permanent magnet produced according to the methods of the invention shown in FIG. 10. The magnetic properties of this sequentially laminated $Sm(Co,Fe,Cu,Zr)_z/Sm_2S_3$ magnet are detailed in FIG. 11.

The electrical resistivity of the magnet of the present invention shown in FIG. 10 was unexpectedly increased by approximately 12 times, i.e., about 1190% compared to the magnet matrix. Improved mechanical strength was also observed.

Example 7

Figure 13:
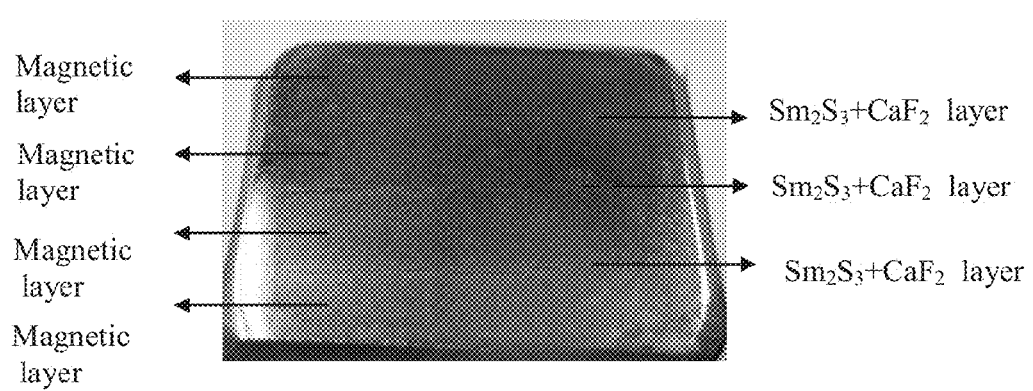
FIG. 13 is a photograph of a sequentially laminated, permanent magnet produced according to the methods of the invention showing three composite layers consisting of mixtures of $Sm_2S_3$ and $CaF_2$ surrounded by diffusion reaction layers.
Figure 14:
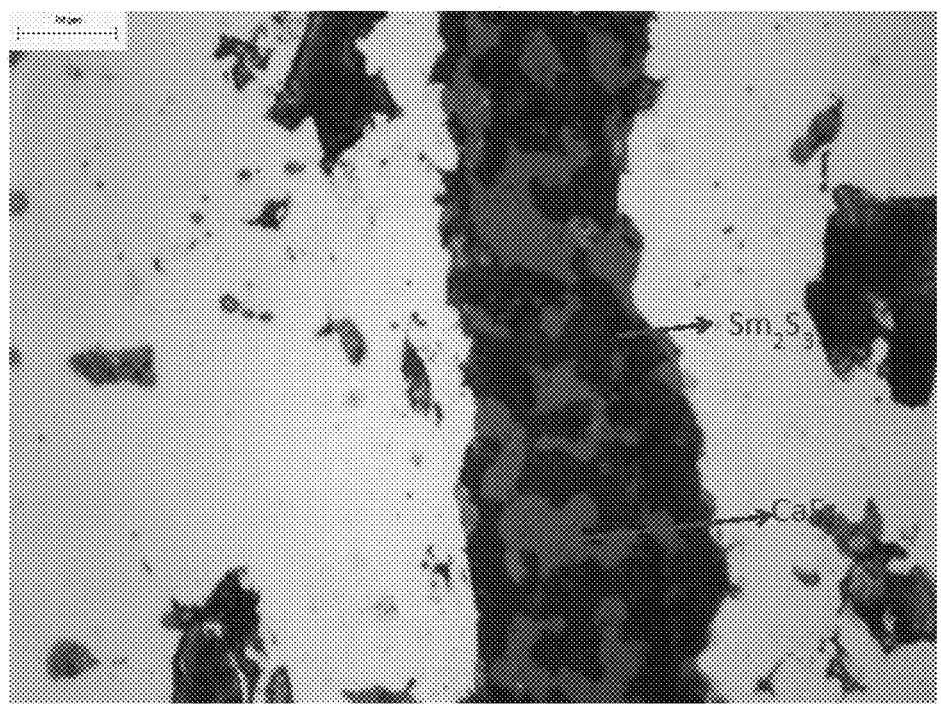
FIG. 14 is an optical microphotograph of one of the composite layers consisting of mixtures of $Sm_2S_3$ and $CaF_2$ dielectric layers shown in FIG. 13.
Figure 15:
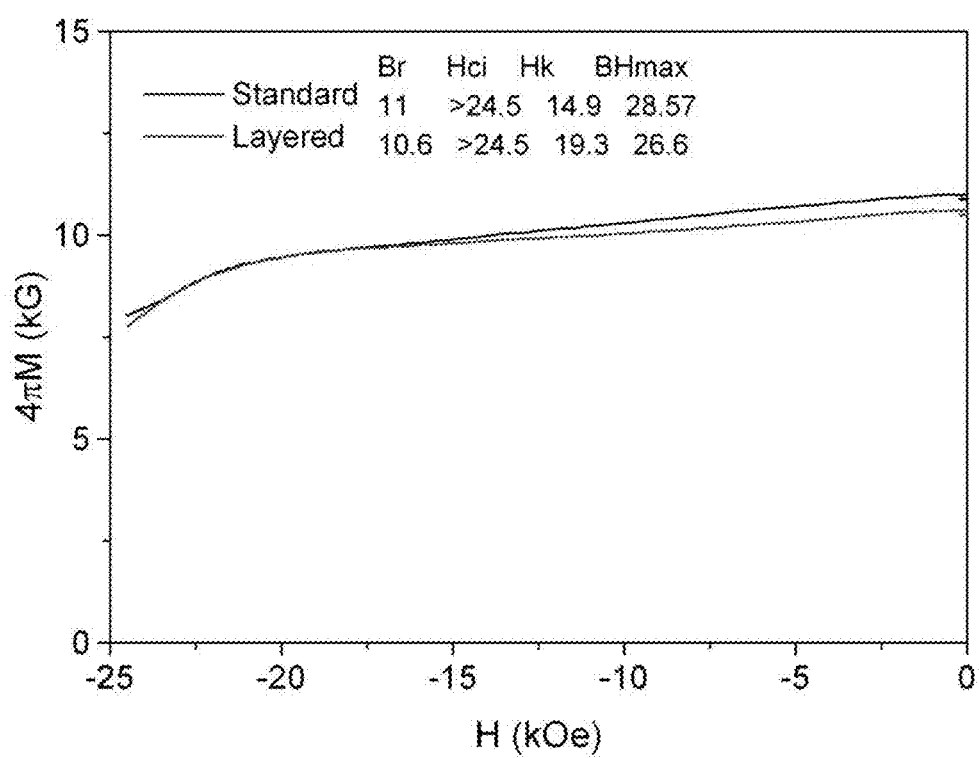
FIG. 15 shows demagnetization curves for a standard permanent magnet and the sequentially laminated, permanent magnet described in FIG. 14 of the invention.

FIGS. 13 through 15

An anisotropic $Sm(Co,Fe,Cu,Zr)_z/(Sm_2S_3+CaF_2)$ sequentially laminated, rare earth, permanent magnet with increased electrical resistivity and improved mechanical strength was produced by a method of the present invention comprising a powder metallurgical processes consisting of (a) sintering at 1195° C., (b) solution treatment at 1180° C., (c) aging at 850° C., followed by (d) a slow cooling 400° C. A sequentially laminated, anisotropic magnet consisting of sequential $Sm(Co,Fe,Cu,Zr)_z$ magnetic layers and $(Sm_2S_3+CaF_2)$ dielectric layers were produced by a one-step sintering process. As shown in FIG. 13, the thickness and uniformity of the sulfide-based, dielectric layers of sequentially laminated, anisotropic, permanent magnets of the invention are successfully controlled by the manufacturing process of the present invention comprising: spraying a colloidal solution of the dielectric submicron $Sm_2S_3+CaF_2$ onto the surface of the compacted $Sm(Co,Fe,Cu,Zr)_z$ layer. The $Sm_2S_3$ dielectric layer has a thickness of about 40 µm.

FIG. 14 shows the optical micrograph of the $(Sm_2S_3+CaF_2)$ layer of the sequentially laminated, permanent magnet shown in FIG. 11.

FIG. 15 shows the demagnetization curve for the sequentially laminated magnet of the present invention shown in FIG. 13 compared with the demagnetization curves of conventional non-layered magnets.

The electrical resistivity of this magnet shown in FIG. 13 was unexpectedly increased by approximately 33 times, compared to the magnet matrix for a continuous $(Sm_2S_3+CaF_2)$ layer. Improved mechanical strength was also observed.

Example 8

Figure 16:
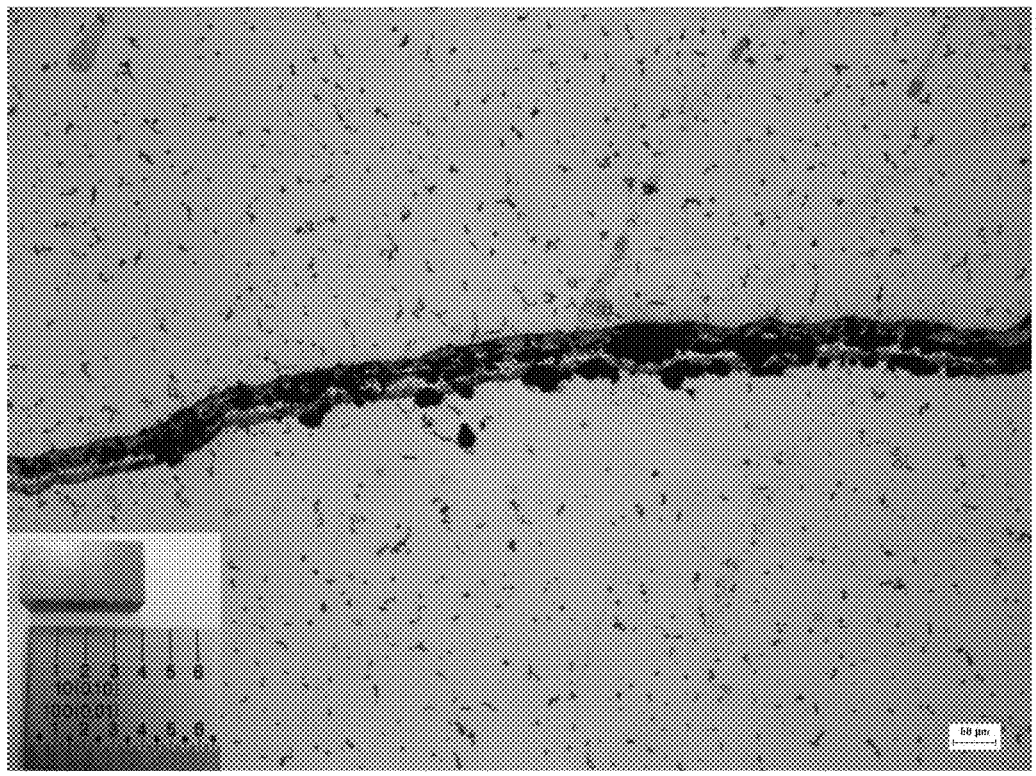
FIG. 16 is an optical micrograph of a sulfide-based dielectric layer in a sequentially laminated, rare earth magnet produced according to the methods of manufacture of the present invention.
Figure 17:
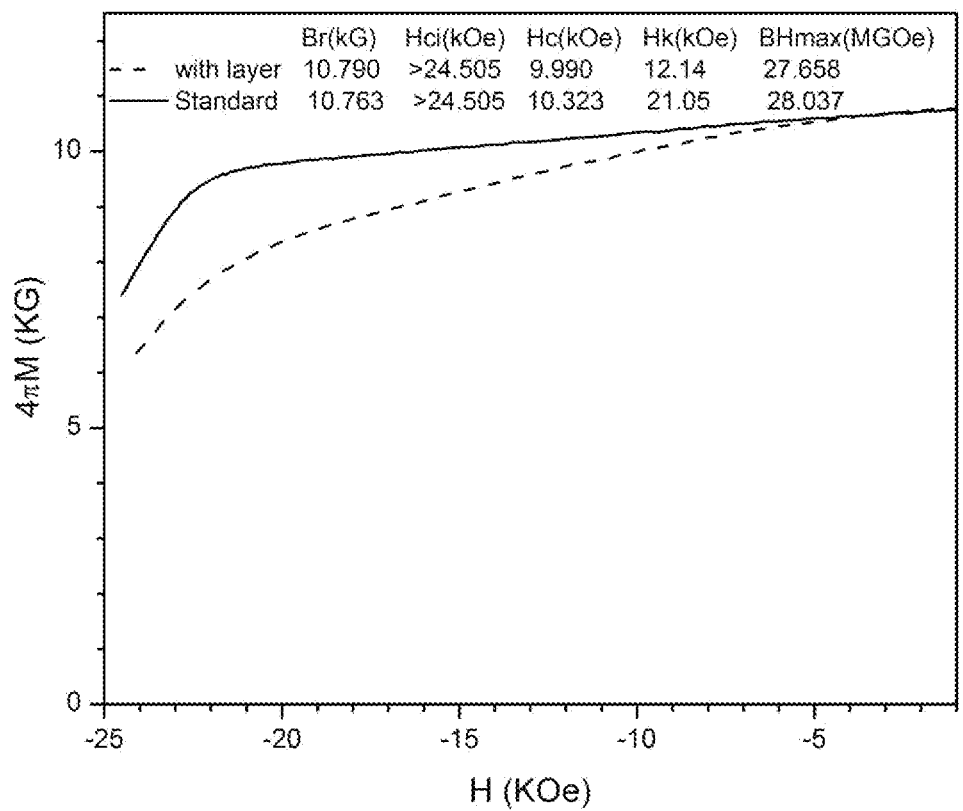
FIG. 17 shows the demagnification, permanent curve for the permanent magnets with a MnS-based dielectric layer produced according to the methods of manufacture of the present invention.

FIGS. 16 and 17

An anisotropic $Sm(Co,Fe,Cu,Zr)_z/MnS$ sequentially laminated, rare earth, permanent magnet with increased electrical resistivity and improved mechanical strength was developed by the method of the present invention comprising a powder metallurgical processes consisting of (a) sintering at 1195° C., (b) solution treatment at 1180° C., (c) aging at 850° C., followed by (d) a slow cooling to 400° C. Sequentially laminated, anisotropic magnets of the present invention consisting of sequential Sm(Co,Fe,Cu,Zr)$_z$ and MnS layers surrounded by diffusion reaction layers were produced by a one-step sintering process of the invention.

As shown in the optical micrograph in FIG. 16, the thickness and uniformity of the dielectric layers of sequentially laminated, anisotropic magnets are successfully controlled by a manufacturing process of the present invention comprising: spraying a colloidal solution of the dielectric submicron MnS onto the compacted magnetic Sm(Co,Fe,Cu,Zr)$_z$ layer. The resulting MnS dielectric layer is surrounded by a diffusion reaction layer, which is about 40 μm thick for this sample. FIG. 16 also shows the interfacial diffusion reaction layers on either side of the dielectric layer, thereby effectively separating the sulfide-based, dielectric layer from the magnetic layers, resulting in an electrical resistivity increase of about 1500% over the magnet matrix. Improved mechanical strength was also observed.

FIG. 17 shows the demagnetization curve for the sequentially laminated magnet, produced according to methods of the present invention, compared with the demagnetization curve for conventional, non-layered, permanent magnets. FIG. 16 inset shows single layers of Sm(Co,Fe,Cu,Zr)$_z$ and MnS dielectric layer of the sequentially laminated, permanent magnet produced according to the methods of the invention.

The electrical resistivity of the magnet produced according to the methods of the present invention shown in FIG. 16 was unexpectedly increased by approximately 15 times, i.e., about 1500% compared to the magnet matrix. Improved mechanical strength was also observed.

Magnetic Properties and Electrical Resistivity Properties of sequentially laminated, permanent magnets produced according to the methods of the present invention, as described in Examples 1 through 8; are summarized in Table 1 below.

TABLE 1

| | | Magnetic Properties | | |
|---|---|---|---|---|
| Example (Figs) | Composition of dielectric layer | Electrical Resistivity Increase* (%) | Residual Induction, B$_r$ (kG) | Intrinsic Coercivity, H$_{ci}$ (kOe) | Maximum Energy Product, (BH)$_{max}$ (MGOe) |
| 2 (3, 4) | Sm$_2$S$_3$ | 3000 | 10.516 | >24.5 | 25.23 |
| 3 (5) | Sm$_2$S$_3$ | 300 | 10.7 | >24.5 | 25.5 |

TABLE 1-continued

| | | Magnetic Properties | | |
|---|---|---|---|---|
| Example (Figs) | Composition of dielectric layer | Electrical Resistivity Increase* (%) | Residual Induction, B$_r$ (kG) | Intrinsic Coercivity, H$_{ci}$ (kOe) | Maximum Energy Product, (BH)$_{max}$ (MGOe) |
| 4 (6, 7) | Sm$_2$S$_3$ | 520 | 10.7 | >24.5 | 27.48 |
| 5 (8, 9) | Sm$_2$S$_3$ | 1190 | 10.58 | >24.5 | 26.07 |
| 6 (10, 11) | Sm$_2$S$_3$ | 1190 | 10.07 | >24.5 | 27.44 |
| 7 (12-15) | (Sm$_2$S$_3$ + CaF$_2$) | 3300 | 10.06 | >24.5 | 26.6 |
| 8 (16-17) | MnS | 1500 | 10.79 | <24.5 | 27.6 |

\# Details on these examples are set out in the discussions of the various Examples.
*Tested from parts machined out of the layered region of the laminated permanent magnets The present invention is further described by the illustrative examples set out in Table 2, which provides additional examples of typical morphologies of the sequentially laminated, rare earth, permanent magnets produced according to methods of the invention having sequential permanent magnet layers and dielectric layers surrounded by transition and/or diffusion reaction layers. The projected increase of the electrical resistivity of such sequentially laminated magnets produced according to methods of the invention which is substantially greater than the electrical resistivity of conventional magnets is achieved without loss in mechanical strength or in magnetic properties. Manufacturing methods of the present invention for the sequentially laminated, rare earth magnets include sintering, hot pressing, die upsetting, spark plasma sintering, microwave sintering, infrared sintering and combustion driven compaction. In Table 2, x=1 to 6, unless otherwise specified.

The following conditions apply to each of Illustrative Examples 8 through 17 in Table 2 as indicated therein by the appropriate symbol (#, +, and *) wherein:

\# RE is preferably Sm with optional other rare earth elements such as Gd, Er, Tb, Pr, and Dy and less than 10% of other metallic or non-metallic elements which are optional and preferably.

+ RE is selected from the group consisting of rare earth elements such as Nd, Pr, Dy, and Tb, and TM is selected from the group of transition metal elements such as Fe, Co, Cu, Ga, and Al. Other metallic or non-metallic elements are optional and preferably less than about 10 wt %.

* The transition and/or diffusion reaction layer contains the listed compounds and other phases, including rare earth transition metal alloys.

TABLE 2

| Permanent magnet layer | | Sulfide-based Dielectric layer | | Diffusion reaction layer | | |
|---|---|---|---|---|---|---|
| Composition | Typical thickness in mm | Composition | Typical thickness in μm | Composition* This layer most likely contains: | Typical thickness in μm | Method of Manufacturing |
| EXAMPLE 9 | | | | | | |
| RE(Co$_u$Fe$_v$Cu$_w$Zr$_h$)$_z$ u = 0.5 to 0.8, v = 0.1 to 0.35, w = 0.01 to 0.20, h = 0.01 to 0.05, z = 6 to 9 # | 0.5-10 | Sm$_2$S$_3$ Sm$_2$S$_3$ + CaF$_2$ Sm$_2$S$_3$ + Ca(F,O)$_x$ REF$_x$ + Sm$_2$S$_3$ Sm$_2$S$_3$ + RE (F,O)$_x$ (RE,Sm)S$_x$ (RE,Sm)(S,O)$_x$ | <500 | Sm$_2$S$_3$ + RE-TM alloys from matrix Sm$_2$S$_3$ + CaF$_2$ + RE-TM alloys from matrix Sm$_2$S$_3$ + Ca(F,O)$_x$ + RE-TM alloys from matrix REF$_x$ + Sm$_2$S$_3$ + RE-TM alloys from matrix Sm$_2$S$_3$ + RE (F,O)$_x$ + RE-TM alloys from matrix (RE,Sm)S$_x$ + RE-TM alloys from matrix (RE,Sm)(S,O)$_x$ + RE-TM alloys from matrix | <100 | Sintering |
| EXAMPLE 10 | | | | | | |
| RE(Co$_u$Fe$_v$Cu$_w$Zr$_h$)$_z$ u = 0.5 to 0.8, v = 0.1 to 0.35, | 0.5-10 | Sm$_2$S$_3$ Sm$_2$S$_3$ + CaF$_2$ Sm$_2$S$_3$ + Ca(F,O)$_x$ | <500 | Sm$_2$S$_3$ + RE-TM alloys from matrix Sm$_2$S$_3$ + CaF$_2$ + RE-TM alloys from matrix Sm$_2$S$_3$ + Ca(F,O)$_x$ + RE-TM alloys from | <100 | Hot Pressing |

TABLE 2-continued

| Composition | Typical thickness in mm | Sulfide-based Dielectric layer composition | Typical thickness in µm | Diffusion reaction layer 1 composition* | Typical thickness in µm | Diffusion reaction layer 2 (between transition and permanent magnet layers) Composition | Typical thickness in µm | Method of Manufacturing |
|---|---|---|---|---|---|---|---|---|
| $w = 0.01$ to $0.20$, $h = 0.01$ to $0.05$, $z = 6$ to $9$ # | | $REF_x + Sm_2S_3$ $Sm_2S_3 + RE(F,O)_x$ $(RE,Sm)S_x$ $(RE,Sm)(S,O)_x$ | | matrix $REF_x + Sm_2S_3 + RE$-TM alloys from matrix $Sm_2S_3 + RE(F,O)_x + RE$-TM alloys from matrix $(RE,Sm)S_x + RE$-TM alloys from matrix $(RE,Sm)(S,O)_x + RE$-TM alloys from matrix | | | | |

EXAMPLE 11

| $RE(Co_uFe_vCu_wZr_h)_z$ $u = 0.5$ to $0.8$, $v = 0.1$ to $0.35$, $w = 0.01$ to $0.20$, $h = 0.01$ to $0.05$, $z = 6$ to $9$ # | 0.5-10 | $Sm_2S_3$ $Sm_2S_3 + CaF_2$ $Sm_2S_3 + Ca(F,O)_x$ $REF_x + Sm_2S_3$ $Sm_2S_3 + RE(F,O)_x$ $(RE,Sm)S_x$ $(RE,Sm)(S,O)_x$ | <500 | $Sm_2S_3 + RE$-TM alloys from matrix $Sm_2S_3 + CaF_2 + RE$-TM alloys from matrix $Sm_2S_3 + Ca(F,O)_x + RE$-TM alloys from matrix $REF_x + Sm_2S_3 + RE$-TM alloys from matrix $Sm_2S_3 + RE(F,O)_x + RE$-TM alloys from matrix $(RE,Sm)S_x + RE$-TM alloys from matrix $(RE,Sm)(S,O)_x + RE$-TM alloys from matrix | <100 | | | Die Upsetting |

EXAMPLE 12

| $RECo_x$ $x = 4$ to $6$ # | 0.5-10 | $Sm_2S_3$ $Sm_2S_3 + CaF_2$ $Sm_2S_3 + Ca(F,O)_x$ $REF_x + Sm_2S_3$ $Sm_2S_3 + RE(F,O)_x$ $(RE,Sm)S_x$ $(RE,Sm)(S,O)_x$ | <500 | $Sm_2S_3 + RE$-TM alloys from matrix $Sm_2S_3 + CaF_2 + RE$-TM alloys from matrix $Sm_2S_3 + Ca(F,O)_x + RE$-TM alloys from matrix $REF_x + Sm_2S_3 + RE$-TM alloys from matrix $Sm_2S_3 + RE(F,O)_x + RE$-TM alloys from matrix $(RE,Sm)S_x + RE$-TM alloys from matrix $(RE,Sm)(S,O)_x + RE$-TM alloys from matrix | <100 | | | Spark Plasma Sintering |

EXAMPLE 13

| $RECo_x$ $x = 4$ to $6$ # | 0.5-10 | $Sm_2S_3$ $Sm_2S_3 + CaF_2$ $Sm_2S_3 + Ca(F,O)_x$ $REF_x + Sm_2S_3$ $Sm_2S_3 + RE(F,O)_x$ $(RE,Sm)S_x$ $(RE,Sm)(S,O)_x$ | <500 | $Sm_2S_3 + RE$-TM alloys from matrix $Sm_2S_3 + CaF_2 + RE$-TM alloys from matrix $Sm_2S_3 + Ca(F,O)_x + RE$-TM alloys from matrix $REF_x + Sm_2S_3 + RE$-TM alloys from matrix $Sm_2S_3 + RE(F,O)_x + RE$-TM alloys from matrix $(RE,Sm)S_x + RE$-TM alloys from matrix $(RE,Sm)(S,O)_x + RE$-TM alloys from matrix | <100 | | | Microwave Sintering |

EXAMPLE 14

| Permanent magnet layer composition | Typical thickness in mm | Sulfide-based Dielectric layer composition | Typical thickness in µm | Diffusion reaction layer 1 composition* | Typical thickness in µm | Diffusion reaction layer 2 (between transition and permanent magnet layers) Composition | Typical thickness in µm | Method of Manufacturing |
|---|---|---|---|---|---|---|---|---|
| $RECo_x$ $x = 4$ to $6$ # | 0.5-10 | $Sm_2S_3$ $Sm_2S_3 + CaF_2$ $Sm_2S_3 + Ca(F,O)_x$ $REF_x + Sm_2S_3$ $Sm_2S_3 + RE(F,O)_x$ $(RE,Sm)S_x$ | <500 | $Sm_2S_3 + RE$-TM alloys from matrix $Sm_2S_3 + CaF_2 + RE$-TM alloys from matrix $Sm_2S_3 + Ca(F,O)_x + RE$-TM alloys from matrix $REF_x + Sm_2S_3 + RE$-TM alloys from matrix $Sm_2S_3 + RE(F,O)_x + RE$-TM alloys from matrix $(RE,Sm)S_x + RE$-TM alloys from matrix | <100 | It primarily consists of RE-TM alloys from the matrix with some dielectric materials from the dielectric layer | <100 | Infrared Sintering |

| Permanent magnet layer Composition | Typical thickness in mm | Sulfide-based Dielectric layer Composition | Typical thickness in µm | Diffusion reaction layer Composition* This layer most likely contains: | Typical thickness in µm | Method of Manufacturing |
|---|---|---|---|---|---|---|

EXAMPLE 15

| $RE_{11.7+x}TM_{88.3-x-y}B_y$ $x = 0$ to $5$, $y = 5$ to $7$ + | 0.5-10 | $Sm_2S_3$ $Sm_2S_3 + CaF_2$ $Sm_2S_3 + Ca(F,O)_x$ | <500 | $Sm_2S_3 + RE$-TM alloys from matrix $Sm_2S_3 + CaF_2 + RE$-TM alloys from matrix $Sm_2S_3 + Ca(F,O)_x + RE$-TM alloys from matrix | <100 | Combustion Driven Compaction |

TABLE 2-continued

| | | | | | | |
|---|---|---|---|---|---|---|
| | | $REF_x + Sm_2S_3$ | | $REF_x + Sm_2S_3$ + RE-TM alloys from matrix | | |
| | | $Sm_2S_3 + RE(F,O)_x$ | | $Sm_2S_3 + RE(F,O)_x$ + RE-TM alloys from matrix | | |
| | | $(RE,Sm)S_x$ | | $(RE,Sm)S_x$ + RE-TM alloys from matrix | | |
| | | $(RE,Sm)(S,O)_x$ | | $(RE,Sm)(S,O)_x$ + RE-TM alloys from matrix | | |
| EXAMPLE 16 | | | | | | |
| $RE_{11.7+x}TM_{88.3-x-y}B_y$ x = 0 to 5, y = 5 to 7 + | 0.5-10 | $Sm_2S_3$ | <500 | $Sm_2S_3$ + RE-TM alloys from matrix | <100 | Sintering |
| | | $Sm_2S_3 + CaF_2$ | | $Sm_2S_3 + CaF_2$ + RE-TM alloys from matrix | | |
| | | $Sm_2S_3 + Ca(F,O)_x$ | | $Sm_2S_3 + Ca(F,O)_x$ + RE-TM alloys from matrix | | |
| | | $REF_x + Sm_2S_3$ | | $REF_x + Sm_2S_3$ + RE-TM alloys from matrix | | |
| | | $Sm_2S_3 + RE(F,O)_x$ | | $Sm_2S_3 + RE(F,O)_x$ + RE-TM alloys from matrix | | |
| | | $(RE,Sm)S_x$ | | $(RE,Sm)S_x$ + RE-TM alloys from matrix | | |
| | | $(RE,Sm)(S,O)_x$ | | $(RE,Sm)(S,O)_x$ + RE-TM alloys from matrix | | |
| EXAMPLE 17 | | | | | | |
| $RE_{11.7+x}TM_{88.3-x-y}B_y$ x = 0 to 5, y = 5 to 7 + | 0.5-10 | MnS | <500 | MnS | <100 | Sintering |
| | | $MnS + CaF_2$ | | $MnCaF_2$ | | |
| | | $Mn(F,O)_x$ | | $SmCa(F,O)_x$ | | |
| | | $RE,SmF_x$ | | $(RESm_2S_3)F_x$ | | |
| | | $RE,Sm(F,O)_x$ | | $RESmS_2(F,O)_x$ | | |
| | | $RES_x$ | | $(RE,Sm)S_x$ | | |
| | | $RE(S,O)_x$ | | $(RE,Sm)(S,O)_x$ | | |

What is claimed is:

1. A method for manufacturing laminated, rare earth, permanent magnet with sulfide-based dielectric layers, having increased electrical resistivity, suitable for use with high performance, rotating machines comprising sequentially laminating:
   (a) rare earth permanent magnet layers, and
   (b) layers selected from the group consisting of transition and/or diffusion reaction layers and combinations thereof, and
   (c) sulfide-based, dielectric layers;
      wherein said transition or diffusion reaction layers physically separate the dielectric layers from said permanent magnet layers.

2. The method of manufacturing sequentially laminated, rare earth, permanent magnet with increased electrical resistivity and improved mechanical strength, according to claim 1; wherein said rare earth, permanent magnet layers are comprised of intermetallic compounds selected from the group consisting of:
   $RE(Co,Fe,Cu,Zr)_z$,
   RE-TM-B,
   $RE_2TM_{14}B$,
   RE-Co
   $RE_2Co_{17}$,
   $RECo_5$ and
   combinations thereof;
wherein z=6 to 9; RE is selected from the group consisting of rare earth elements including yttrium and mixtures thereof, and TM is selected from the group of transition metals consisting of Fe, Co and other transition metal elements.

3. The method of claim 1; wherein said sulfide-based, dielectric layer is selected from the group consisting of:
   sulfides,
   sulfide and fluorides,
   oxysulfides,
   mixtures of sulfides, sulfides and fluorides, oxysulfides and oxyfluorides,
   and
   combinations thereof.

4. The method of claim 3; wherein said sulfides are selected from the group consisting of:
   $Al_2S_3$, $Sb_2S_3$, $As_2S_3$, BaS, BeS, $Bi_2S_3$, $B_2S_3$, CdS, CaS, CeS, $Ce_2S_3$, WS, $Cr_2S_3$, CoS, $CoS_2$, $Cu_2S$, CuS, $Dy_2S_3$, $Er_2S_3$, EuS, $Gd_2S_3$, $Ga_2S_3$, GeS, $GeS_2$, $HfS_2$, $Ho_2S_3$, $In_2S$, InS, FeS, $FeS_2$, $La_2S_3$, $LaS_2$, $La_2O_2S$, PbS, $Li_2S$, MgS, MnS, HgS, $MoS_2$, $Nd_2S_3$, NiS, NdS, $K_2S$, $Pr_2S_3$, $Sm_2S_3$, $Sc_2S_3$, $SiS_2$, $Ag_2S$, $Na_2S$, STS, $Tb_2S$, $Tl_2S$, $ThS_2$, $Tm_2S_3$, SnS, $SnS_2$, $TiS_2$, $WS_2$, $US_2$, $V_2S_3$, $Yb_2S_3$, $Y_2S_3$, $Y_2O_2S$, ZnS, $ZrS_2$ and combinations thereof.

5. The method of claim 1; wherein the thickness of said sulfide-based, dielectric layer is less than about 2 mm.

6. The method of claim 1; wherein the thickness of said sulfide-based, dielectric layer is less than about 500 μm.

7. The method of claim 2; wherein said rare earth permanent magnet layers are represented by the chemical formula:

$RE_{11.7+x}TM_{88.3-x-y}B_y$ where x=0 to 5, y=5 to 7; RE is selected from the group consisting of rare earth elements including Nd, Pr, Dy and Tb; and TM is selected from the group consisting of the transition metal elements Fe, Co, Cu, Ga and Al.

8. The method of claim 1; wherein said transition layer consists of rare earth rich alloys represented by the formula:

$RE_{11.7+x}TM_{88.3-x-y}B_y$ where x is from 5 to 80, y is from 0 to 6; RE is selected from the group consisting of rare earth elements including Nd, Pr, Dy and Tb; and TM is selected from the group consisting of the transition metal elements Fe, Co, Cu, Ga and Al.

9. The method of claim 2; wherein said rare earth, permanent magnet layers are represented by the formula:

$RE(Co_uFe_vCu_wZr_h)$ wherein u is from about 0.5 to 0.8, v is from about 0.1 to 0.35, w is from about 0.01 to 0.2, h is from about 0.01 to 0.05, and z is from about 6 to 9; and wherein RE is selected from the group consisting of Sm, Gd, Er, Tb, Pr, Dy and combinations thereof.

10. The method of claim 2; wherein said rare earth magnet material is represented by the formula:

$$RECo_x$$

where x=4 to 6 and RE represents rare earth elements are selected from the group consisting of Sm, Gd, Er, Tb, Pr, Dy and mixtures thereof.

11. The method of claim 1; wherein said transition layers comprise a rare earth rich alloy having the formula:

$$RE(Co_uFe_vCu_wZr_h)_z$$

wherein u=0 to 0.8, v=0 to 0.35, w=0 to 0.20, h=0 to 0.05, z=1 to 7; and RE is selected from the group consisting of rare earth elements and mixtures thereof.

12. The method of claim 1; wherein said transition layers comprise a rare earth rich alloy having the formula:

$$RECo_x$$

where x is from 1 to 4 and RE is selected from the group consisting of rare earth elements and mixtures thereof.

13. The method of claim 4; wherein said sulfide-based, dielectric layer comprises at least 30 weight % of substances selected from the group consisting of sulfides, sulfides and fluorides, oxysulfides and mixtures of sulfides, sulfides and fluorides, oxysulfides and oxyfluorides and combinations thereof; where the balance is a rare earth, rich alloy having the formula:

$$RE_{11.7+x}TM_{88.3-x-y}B_y$$

where x=5 to 80, y=0 to 6: RE is selected from the group consisting of rare earth elements and mixtures thereof and TM is selected from the group consisting of transition metal elements Fe, Co, Cu, Ga, and Al.

14. The method of claim 1; wherein said sulfide-based, dielectric layer comprises at least 30 weight % of substances selected from the group consisting of sulfides, sulfides and fluorides, fluorides, oxysulfides and oxyfluorides and mixtures of sulfides, sulfides and fluorides, oxysulfides, oxyfluorides and combinations thereof; and the balance is a rare earth rich alloy having the formula:

$$RE(Co_uFe_vCu_wZr_h)_z$$

wherein u=0 to 0.8, v=0 to 0.35, w=0 to 0.20, h=0 to 0.05, z=1 to 7; and RE is selected from the group consisting of rare earth elements selected from the group consisting of Nd, Pr, Dy, and Tb.

15. The method of claim 13; wherein said rare earth, rich alloy has the formula:

$$RECo_x$$

wherein x=1 to 4.

16. Methods for sequentially laminating rare earth, permanent magnets manufactured according to the method of claim 1; wherein the diffusion reaction interface layer and transition layer are discontinuous, non-planar and have irregular thickness.

17. Methods for sequentially laminating rare earth, permanent magnets manufactured according to the method of claim 1; wherein said laminated, sulfide-based, dielectric layers are discontinuous, non-planar and have irregular thickness.

* * * * *